(12) United States Patent
Wu et al.

(10) Patent No.: US 12,226,060 B2
(45) Date of Patent: Feb. 18, 2025

(54) DETECTION METHOD, MOBILE ROBOT AND STORAGE MEDIUM

(71) Applicant: Yunjing Intelligence Technology (Dongguan) Co., Ltd., Dongguan (CN)

(72) Inventors: Yihao Wu, Dongguan (CN); Kanghua Liang, Dongguan (CN)

(73) Assignee: YUNJING INTELLIGENCE TECHNOLOGY (DONGGUAN) CO., LTD., Dongguan (CN)

( * ) Notice: Subject to any disclaimer, the term of this patent is extended or adjusted under 35 U.S.C. 154(b) by 481 days.

(21) Appl. No.: 17/497,901

(22) Filed: Oct. 9, 2021

(65) Prior Publication Data

US 2022/0022716 A1 Jan. 27, 2022

Related U.S. Application Data

(63) Continuation of application No. PCT/CN2020/083617, filed on Apr. 8, 2020.

(30) Foreign Application Priority Data

Apr. 9, 2019 (CN) .......................... 201910281173.8

(51) Int. Cl.
*A47L 11/40* (2006.01)
*G05D 1/00* (2006.01)

(52) U.S. Cl.
CPC ........ *A47L 11/4011* (2013.01); *G05D 1/0219* (2013.01); *G05D 1/024* (2013.01); *G05D 1/0274* (2013.01); *A47L 2201/04* (2013.01)

(58) Field of Classification Search
CPC ............. A47L 11/4011; A47L 2201/04; G05D 1/0219; G05D 1/024; G05D 1/0274; G05D 2201/0203
See application file for complete search history.

(56) References Cited

U.S. PATENT DOCUMENTS

2021/0131822 A1* 5/2021 Artes ................. G01C 21/3848
2022/0100201 A1* 3/2022 Hara ..................... G05D 1/024

FOREIGN PATENT DOCUMENTS

CN 103472823 A 12/2013
CN 103926930 A 7/2014
(Continued)

OTHER PUBLICATIONS

Holz et al., Evaluating the Efficiency of Frontier-based Exploration Strategies, Proceedings for the Joint Conference of ISR 2010 (41st International Symposium of Robotics), pp. 36-43, dated Jun. 1, 2011.
(Continued)

*Primary Examiner* — Dalena Tran

(57) ABSTRACT

A detection method, a mobile robot and a storage medium belong to the technology field of the intelligent robot. The method applied to the mobile robot includes: obtaining a first region environment map through the detection sensor detecting the region environment; generating a detection target point based on the first region environment map; generating a first detection path based on the detection target point; obtaining a second region environment map through the detection sensor detecting the region environment during a movement according to the first detection path; in response
(Continued)

to detecting that path detection executed by the mobile robot is over, generating the first detection path based on the second region environment map, determining a third region environment map according to the first detection path; loop executing an operation of determining the region environment map until the mobile robot detects that the entire region environment map is drawn.

16 Claims, 26 Drawing Sheets

(56) References Cited

FOREIGN PATENT DOCUMENTS

| | | |
|---|---|---|
| CN | 104714555 A | 6/2015 |
| CN | 204374771 U | 6/2015 |
| CN | 106647774 A | 5/2017 |
| CN | 108106616 A | 6/2018 |
| CN | 108344419 A | 7/2018 |
| CN | 109085605 A | 12/2018 |
| CN | 109240303 A | 1/2019 |
| CN | 109946715 A | 6/2019 |
| EP | 3428885 A1 | 1/2019 |
| JP | 2017111473 A | 6/2017 |
| JP | 2017224048 A | 12/2017 |
| JP | 2018142154 A | 9/2018 |
| WO | 2018114412 A1 | 6/2018 |
| WO | 2019053062 A1 | 3/2019 |

OTHER PUBLICATIONS

Mei et al., Energy-Efficient Mobile Robot Exploration, Proceedings of the 2006 IEEE International Conference on Robotics and Automation, Orlando, Florida, pp. 505-511, dated May 15, 2006.

First Office Action issued in counterpart Chinese Patent Application No. 201910281173.8, dated Sep. 24, 2020.

International Search Report and Written Opinion issued in corresponding PCT Application No. PCT/CN2020/083617, dated Jun. 30, 2020.

"Energy-Efficient Mobile Robot Exploration", Proceedings of the 2006 IEEE International Conference on Robotics and Automation, Orlando, Florida, May 15-19, 2006, pp. 505-511.

"Energy-Efficient Mobile Robot Exploration" Authors: Yongguo Mei et al., Published in: Proceedings 2006 IEEE International Conference on Robotics and Automation, 2006. ICRA 2006, 8 Pages, published on May 19, 2006.

* cited by examiner

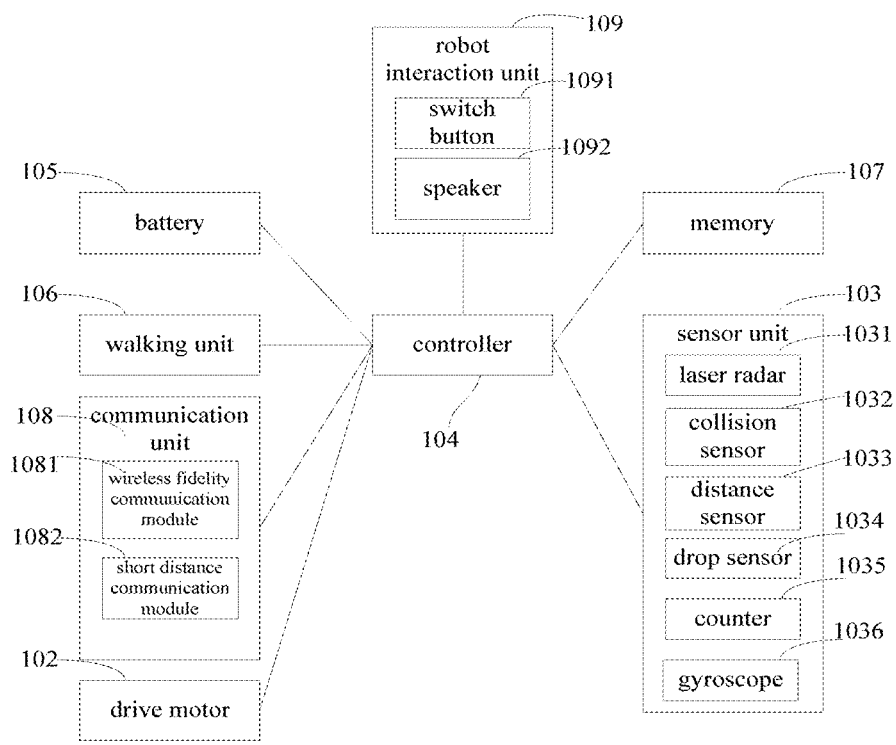

Fig. 5

| obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment | S1 |
|---|---|
| determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor | S2 |
| during a movement of the mobile robot according to the first detection path, obtaining a second region environment map through the detection sensor detecting the region environment, the second region environment map comprising an outer contour of a region environment detected by the mobile robot during the movement and the outer contour of the first region environment map | S3 |
| in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing an operation of determining a region environment map until the mobile robot detects that the entire region environment map is drawn | S4 |

Fig. 6 obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against a wall and a free obstacle, the free obstacle being an obstacle that is less than or equal to a body width of the mobile robot from any other obstacle on the outer contour of the region environment — 1201 determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor — 1202 during a movement of the mobile robot according to the first detection path, obtaining a second region environment map through the detection sensor detecting the region environment, the second region environment map comprising an outer contour of a region environment detected by the mobile robot during the movement and the outer contour of the first region environment map — 1203 in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and the outer contour of the second region environment map, loop executing an operation of determining the region environment map until the mobile robot detects that the entire region environment map is drawn — 1204

Fig. 12

```
┌─────────────────────────────────────────────────────────────────┐
│ obtaining a first region environment map through the detection sensor detecting the │
│ region environment, the first region environment map comprising an outer contour    │
│ of a region environment currently detectable by the mobile robot and the undetected │── 1301
│ region, the outer contour comprising obstacles around the region environment, the   │
│ obstacles representing a wall around the region environment, an obstacle placed     │
│ against the wall and a free obstacle, the free obstacle being an obstacle that is less │
│ than or equal to a body width of the mobile robot from any other obstacle on the    │
│ outer contour of the region environment                                             │
└─────────────────────────────────────────────────────────────────┘
                                  ↓
┌─────────────────────────────────────────────────────────────────┐
│ extracting the outer contour of the region environment and the undetected region    │── 1302
│ from the first region environment map to form a detection map, and determining a    │
│ detection start point in the detection map                                          │
└─────────────────────────────────────────────────────────────────┘
                                  ↓
┌─────────────────────────────────────────────────────────────────┐── 1303
│ starting from the detection start point, traversing the outer contour of the region │
│ environment in the detection map along a clockwise or counterclockwise direction    │
│ to query a first point located at the junction of the detected region and the       │
│ undetected region as the detection target point                                     │
└─────────────────────────────────────────────────────────────────┘
                                  ↓
┌─────────────────────────────────────────────────────────────────┐
│ generating a first detection path based on the detection target point, the first    │
│ detection path configured for guiding a movement of the mobile robot, the first     │── 1304
│ detection path comprising a start point of the first detection path and an end point of │
│ the first detection path, the start point of the first detection path being a current │
│ position of the mobile robot when detecting the first region environment map, a     │
│ distance between the end point of the first detection path and the detection target │
│ point not exceeding the detection range of the detection sensor                     │
└─────────────────────────────────────────────────────────────────┘
                                  ↓
┌─────────────────────────────────────────────────────────────────┐
│ during a movement of the mobile robot according to the first detection path,        │── 1305
│ obtaining a second region environment map through the detection sensor detecting    │
│ the region environment, the second region environment map comprising an outer       │
│ contour of a region environment detected by the mobile robot during the movement    │
│ and the outer contour of the first region environment map                           │
└─────────────────────────────────────────────────────────────────┘
                                  ↓
┌─────────────────────────────────────────────────────────────────┐
│ in response to detecting that path detection executed by the mobile robot is over,  │
│ taking the end point of the first detection path as a start point of a second detection │
│ path and generating the second detection path based on the second region            │
│ environment map, determining a third region environment map according to the        │── 1306
│ second detection path, the third region environment map including an outer contour  │
│ of the region environment detected by the mobile robot during a movement            │
│ according to the second detection path according to the second detection path and   │
│ the outer contour of the second region environment map, loop executing an           │
│ operation of determining the region environment map until the mobile robot detects  │
│ that the entire region environment map is drawn                                     │
└─────────────────────────────────────────────────────────────────┘
```

Fig. 13

| obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment | 1701 |

↓

| extracting the outer contour of the region environment and the undetected region from the first region environment map to form a detection map, and determining a detection start point in the detection map | 1702 |

↓

| starting from the detection start point, traversing the outer contour of the region environment in the detection map along a clockwise or counterclockwise direction to query a first point located at the junction of the detected region and the undetected region as the detection target point | 1703 |

↓

| taking the detection target point as a center to determine the end point of the first detection path within the detection range of the mobile robot, the distance between the detection target point and the end point of the first detection path not exceeding the detection range of the sensor of the mobile robot, such that the mobile robot is capable of detecting the detection target point at the end point of the first detection path | 1704 |

↓

| generating the first detection path by taking the start point of the first detection path as a start point and taking the end point of the first detection path as an end point | 1705 |

↓

| during a movement of the mobile robot according to the first detection path, obtaining a second region environment map through the detection sensor detecting a region environment, the second region environment map comprising an outer contour of a region environment detected by the mobile robot during the movement and the outer contour of the first region environment map | 1706 |

↓

| in response to detecting that path detection executed by the mobile robot is over, taking the end point of the first detection path as a start point of a second detection path and generating the second detection path based on the second region environment map, determining a third region environment map according to the second detection path, the third region environment map including an outer contour of the region environment detected by the mobile robot during a movement according to the second detection path and an outer contour of the second region environment map, loop executing an operation of determining the region environment map until the mobile robot detects that the entire region environment map is drawn | 1707 |

Fig. 17

| obtaining a first region environment map through the detection sensor detecting a region environment, the first region environment map comprising an outer contour of a region environment currently detectable by the mobile robot and the undetected region, the outer contour including obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment | 1901 |
|---|---|
| extracting the outer contour of the region environment and the undetected region from the first region environment map to form a detection map, and determining a detection start point in the detection map | 1902 |
| starting from the detection start point, traversing the outer contour of the region environment in the detection map along a clockwise or counterclockwise direction to query a first point located at the junction of the detected region and the undetected region as the detection target poin | 1903 |
| taking the detection target point as a center to determine the end point of the first detection path within the detection range of the mobile robot, the distance between the detection target point and the end point of the first detection path not exceeding the detection range of the sensor of the mobile robot, such that the mobile robot is capable of detecting the detection target point at the end point of the first detection path | 1904 |
| generating the first detection path by taking the start point of the first detection path as a start point and taking the end point of the first detection path as an end point | 1905 |
| during a movement of the mobile robot according to the first detection path, obtaining a second region environment map through the detection sensor detecting the region environment, the second region environment map comprising an outer contour of a region environment detected by the mobile robot during the movement and the outer contour of the first region environment map | 1906 |
| in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and an outer contour of the second region environment map, loop executing an operation of determining the region environment map until the mobile robot detects that the entire region environment map is drawn | 1907 |

Fig. 23 obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment — 2801 extracting the outer contour of the region environment and the undetected region from the first region environment map to form a detection map, and determining a detection start point in the detection map — 2802 starting from the detection start point, traversing the outer contour of the region environment in the detection map along a clockwise or counterclockwise direction to query a first point located at the junction of the detected region and the undetected region as the detection target point — 2803 taking the detection target point as a center to determine the end point of the first detection path within the detection range of the mobile robot — 2804 generating the first detection path by taking the start point of the first detection path as a start point and taking the end point of the first detection path as an end point — 2805 during a movement of the mobile robot according to the first detection path, obtaining a second region environment map with the detection sensor detecting the region environment, the second region environment map including an outer contour of a region environment detected by the mobile robot during the movement and the outer contour in the first region environment map — 2806 in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement and the outer contour of the second region environment map, loop executing an operation of determining the region environment map until the mobile robot detects that the entire region environment map is drawn — 2807

Fig. 28

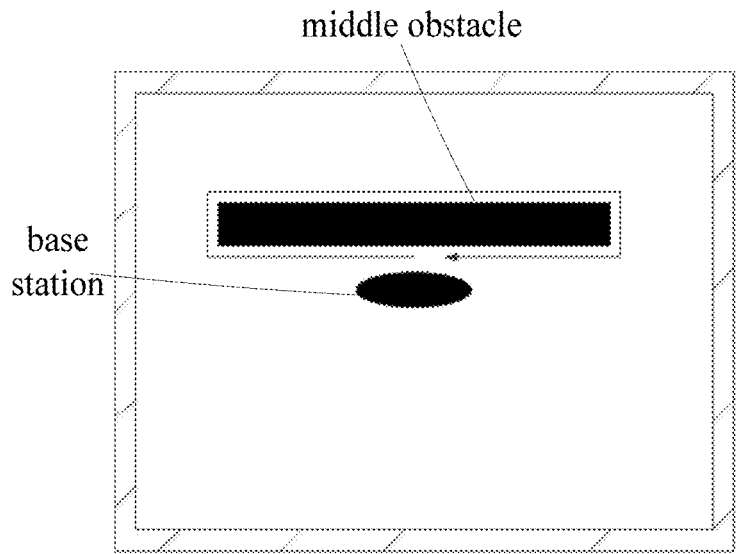

Fig. 29

| |
|---|
| obtaining a first region environment map with the detection sensor detecting a region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment — 3001 |
| determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor — 3002 |
| during a movement of the mobile robot according to the first detection path, obtaining a second region environment map with the detection sensor detecting the region environment, the second region environment map comprising an outer contour of a region environment detected by the mobile robot during the movement and the outer contour of the first region environment map — 3003 |
| in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement and an outer contour of the second region environment map, loop executing the operation of determining the region environment map until the mobile robot detects that the entire region environment map is drawn — 3004 |

Fig. 30 obtaining a first region environment map through the detection sensor detecting the region environment, the first region environment map comprising an outer contour of the region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment ⸺ 3501 determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor ⸺ 3502 during a movement of the mobile robot according to the first detection path, obtaining a second region environment map through the detection sensor detecting the region environment, the second region environment map comprising an outer contour of a region environment detected by the mobile robot during the movement and an outer contour of the first region environment map ⸺ 3503 in response to detecting that path detection executed by the mobile robot is over, taking the end point of the first detection path as a start point of a second detection path and generating the second detection path based on the second region environment map, determining a third region environment map according to the second detection path, the third region environment map including an outer contour of the region environment detected by the mobile robot during a movement and an outer contour of the second region environment map, loop executing an operation of determining the region environment map until the mobile robot detects that the entire region environment map is drawn ⸺ 3504

Fig. 35

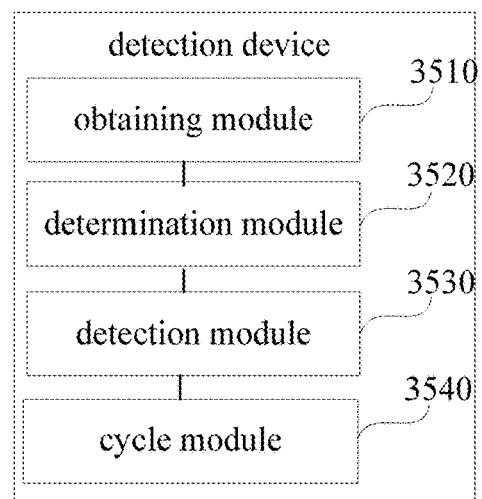

Fig. 36

DETECTION METHOD, MOBILE ROBOT AND STORAGE MEDIUM

CROSS-REFERENCE TO RELATED APPLICATIONS

The present application is a continuation application of International Application No. PCT/CN2020/083617, filed on Apr. 8, 2020, which claims to priority of Chinese Patent Application No. 201910281173.8, filed on Apr. 9, 2019 in the China National Intellectual Property Administration (CNIPA) and titled "Detection Method, Device, Mobile Robot and Storage Medium", the entire contents of which are incorporated herein by reference.

FIELD

The present application relates to the technology field of intelligent robots, particularly to a detection method, a mobile robot and a storage medium.

BACKGROUND

At present, mobile robots such as sweeping robots and mopping robots are widely used. Generally it is needed for the mobile robots to detect the region environment in the working process, so as to draw a map of the region environment based on the detection result, thereby automatically completing the cleaning of the region environment based on the map.

In the related art, a mobile robot is used in conjunction with a base station. The base station is used to clean the mobile robot or charge the mobile robot. The mobile robot carries out a carpet search according to a side winding movement trajectory to search and detect outward from a position of the base station. The mobile robot adopts a sensor to detect during the movement until all passable regions are traversed, and then adopts the detected data to draw a map of the region environment.

However, in the above implementation, when the mobile robot needs to go back to the base station for cleaning or charging, it will travel back and forth to the base station. During this process, the detected region will be repeatedly detected, and work efficiency is thus reduced. In addition, the mobile robot needs to traverse completely all passable regions, resulting in long time-consuming for mapping and low work efficiency of the mobile robot.

SUMMARY

Embodiments of the present application provide a detection method, device, mobile robot and storage medium, which can solve a problem of repeating detection, long time-consuming for mapping and low work efficiency of the mobile robot. The technology solution is as follows.

A first aspect provides a detection method, applied to a mobile robot to detect a region environment for drawing a region environment map, wherein the mobile robot is provided with a detection sensor, the region environment map is gradually expanded by a combination of detection of the detection sensor and a behavior path of the mobile robot until an entire region environment map is finally generated, wherein a region detected by the detection sensor is a detected region, a region not detected by the detection sensor is an undetected region, the method includes:

step S1, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment;

step S2, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor;

step S3, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map; and step S4, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing an operation of determining a region environment map until the mobile robot detects that the entire region environment map is drawn;

wherein the mobile robot is configured to move along the outer contour while keeping a certain distance from the outer contour and/or move along an edge of the outer contour when moving according to the detection path generated based on any one of region environment maps.

A second aspect provides a mobile robot, the mobile robot is provided with a detection sensor and the mobile robot includes: a processor, and a memory configured for storing executable instructions of the processor; wherein the processor is configured for implementing steps of the detection method of the above-mentioned first aspect.

A third aspect provides a non-transitory computer readable storage medium, on which instructions are stored, when the instructions are executed by a processor, a detection method described in the above-mentioned first aspect is implemented.

A fourth aspect provides a non-transitory computer program product containing instructions, when the non-transitory computer program product is run on a device, a detection method described in the above-mentioned first aspect is executed by the device.

The beneficial effect brought by the technical solutions provided by the embodiments of the present application is as follows.

The mobile robot determines a first region environment map through the detection sensor detecting the region environment, the first region environment map includes an outer contour of the detected region and the undetected region. The detection target point corresponding to a position needed to be detected is determined according to the first region environment map. The end point of the first detection path of the first detection path is determined based on the detection target point. In such way, the first detection path is generated based on a current position of the mobile robot when detecting the first region environment map and the end point of the first detection path. The mobile robot moves along the first detection path and obtains the detection data detected by the detection sensor during a movement. When it is detected that an execution of the path detection is over, a next detection path is determined based on the obtained detection data, that is, the second detection path is determined, and the second region environment map is obtained by executing a detection operation based on the second detection path. In such way, an operation of determining the detection path to generate the region environment map is executed cyclically to gradually expand the region environment map until the mobile robot detects that the entire region environment map is drawn. The mobile robot detects the region environment based on the generated detection path every time, thereby avoiding a problem of repeating detection of the detected region when the mobile robot goes back and forth to the base station, which improves work efficiency. In addition, the mobile robot does not need to traverse all passable regions, thereby reducing the time-consuming for mapping of the mobile robot.

BRIEF DESCRIPTION OF THE DRAWINGS

In order to more clearly describe the technical solutions in the embodiments of the present application, the drawings required to be used in the description of the embodiments will be briefly introduced as below. Obviously, the drawings described below are only some embodiments of the present application. For those of ordinary skill in the art, other drawings can be obtained according to the structures shown in those drawings without creative work.

FIG. 5 is a schematic structural diagram of a mobile robot according to still another exemplary embodiment.

FIG. 6 is a flow diagram of a detection method according to an exemplary embodiment.

FIG. 12 is a flow diagram of a detection method according to another exemplary embodiment.

FIG. 13 is a flow diagram of a detection method according to still another exemplary embodiment.

FIG. 17 is a flow diagram of a detection method according to still another exemplary embodiment.

FIG. 23 is a flow diagram of a detection method according to another exemplary embodiment.

FIG. 28 is a flow diagram of a detection method according to another exemplary embodiment.

FIG. 29 is a schematic diagram of a region environment according to an exemplary embodiment.

FIG. 30 is a flow diagram of a detection method according to another exemplary embodiment.

FIG. 35 is a flow diagram of a detection method according to another exemplary embodiment.

FIG. 36 is a schematic structural diagram of a detection device for a region environment according to an exemplary embodiment.

DETAILED DESCRIPTION OF THE EMBODIMENTS

For the purpose of facilitating understanding, technology solution and advantage of the present application, the embodiments of the present application will be described in detail as below in combination with the drawings.

Before describing in detail the detection method provided by the embodiment of the present application, the execution subject involved in the embodiments of the present application will be introduced first. The detection method provided by the embodiment of the present application can be executed by a mobile robot. The mobile robot can be a cleaning robot, a storage robot, an exhibition robot, etc. The cleaning robot can be used to automatically clean the floor. The application scenarios of the cleaning robot can be household indoor cleaning, large-scale cleaning, etc. In some embodiments, the cleaning robot can include, but is not limited to, sweeping robot and mopping robot.

Figure 1:
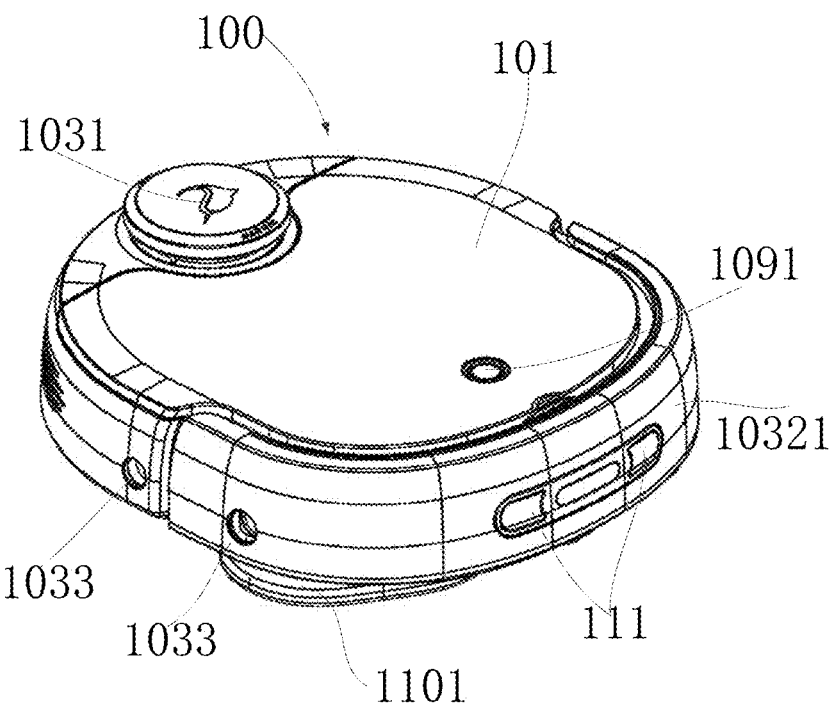
FIG. 1 is a schematic perspective view of a mobile robot according to an exemplary embodiment.
Figure 2:
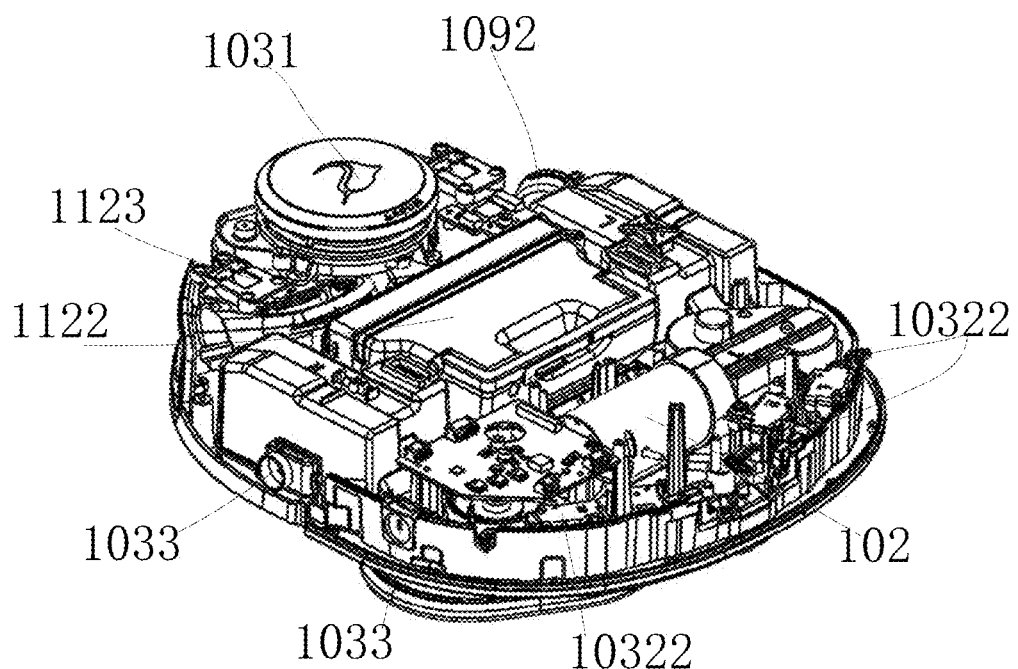
FIG. 2 is a schematic structural diagram of a mobile robot according to another exemplary embodiment.

Please refer to FIG. 1, FIG. 1 is a schematic perspective view of a cleaning robot 100 provided by an embodiment of the preset application. FIG. 2 is a schematic structural diagram of the cleaning robot 100 shown in FIG. 1 after a part of housing is removed.

Types of the cleaning robots 100 includes: a sweeping robot 1001 and a mopping robot 1002, etc.

As shown in FIG. 1 and FIG. 2, the cleaning robot 100 includes a robot body 101, a drive motor 102, a sensor unit 103, a controller 104, a battery 105, a walking unit 106, a memory 107, a communication unit 108, a robot interaction unit 109, and a cleaning element, a charging component 111, etc.

The robot body 101 can be a circular structure, a square structure, etc. In the embodiment of the present application, the robot body 101 having a D-shaped structure is taken as an example for description. As shown in FIG. 1, a front part of the robot body 101 is a rectangular structure with rounded corners, and a rear part of the robot body 101 is a semicircular structure. In the embodiment of the present application, the robot body 101 has a left-right symmetric structure.

The cleaning element is configured for cleaning the floor. A number of cleaning elements can be one or more. The cleaning element is provided at the bottom of the robot body 101, specifically at a front position of the bottom of the robot body 101. A drive motor 102 is provided inside the robot body 101, two rotating shafts extend from the bottom of the robot body 101. The cleaning element is sleeved on the rotating shafts. The drive motor 102 can drive the rotating shafts to rotate, thereby the rotating shafts drive the cleaning element to rotate.

Figure 3:
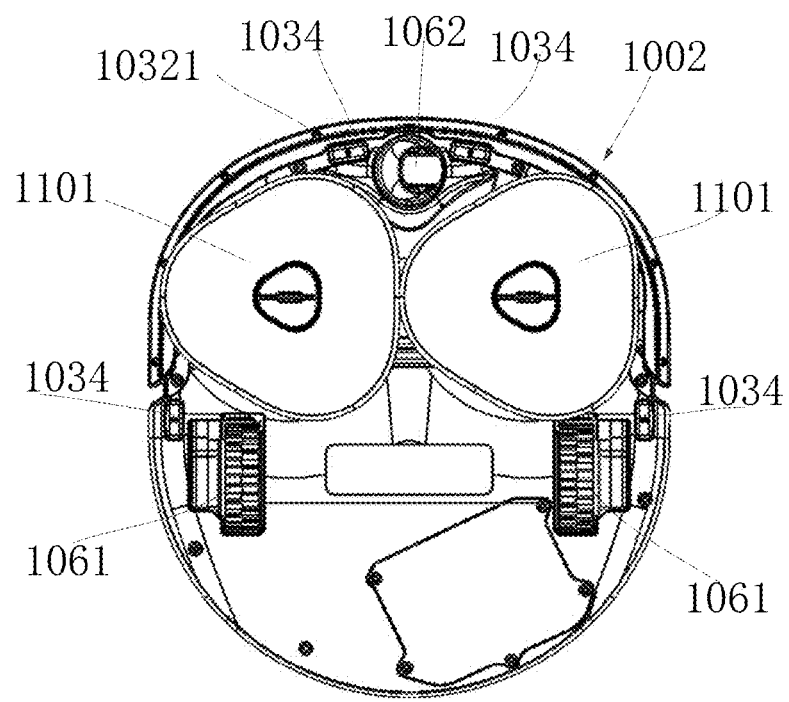
FIG. 3 is a schematic structural diagram of a mobile robot according to still another exemplary embodiment.

As shown in FIG. 3, for the mopping robot 1002, the cleaning element is specifically a mopping element 1101. The mopping element 1101 is a mop for example. The mopping element 1101 is configured for mopping and cleaning a floor.

Figure 4:
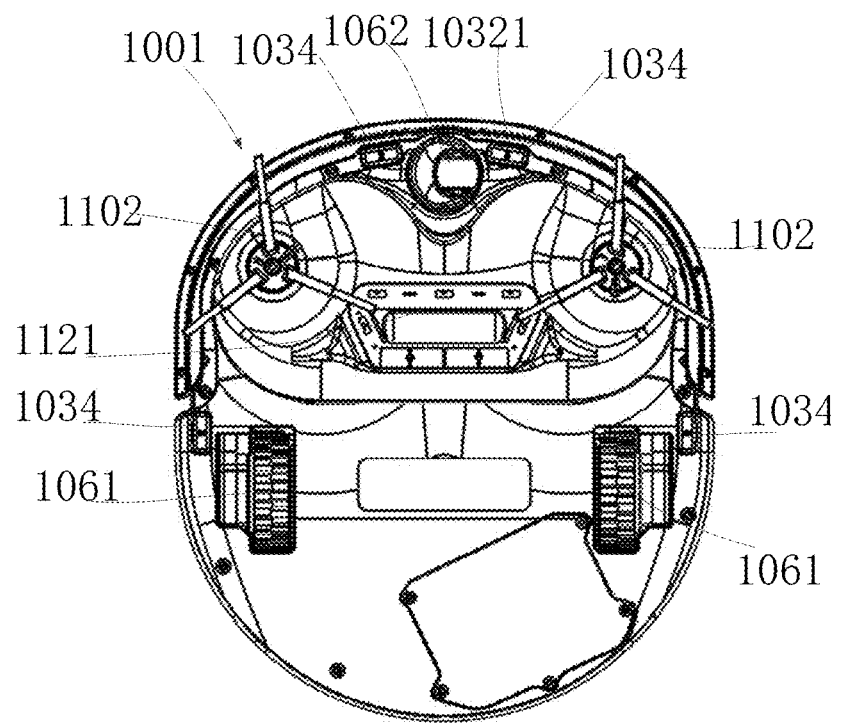
FIG. 4 is a schematic structural diagram of a mobile robot according to still another exemplary embodiment.

As shown in FIG. 4, for the sweeping robot 1001, the cleaning element is specifically a side brush 1102. The side brush 1102 is configured for sweeping and cleaning the floor. The sweeping robot 1001 is also provided with a dust suction device, which includes a dust suction port 1121 provided at the bottom of the robot body 101 and a dust box 1122 and a fan 1123 provided inside the robot body 101. The side brush 1102 is provided on the rotating shaft at the bottom of the sweeping robot 1001. After the rotating shaft drives the side brush 1102, the rotating side brush 1102 sweeps garbage such as dust, etc. to the dust suction port 1121 at the bottom of the sweeping robot 1001. Due to the suction effect of the fan 1123, the garbage is sucked into the dust suction port 1121 and enters the dust box 1122 through the dust suction port 1121 for a temporary storage.

In the embodiment of the present application, the cleaning element of the cleaning robot 100 can be set as a detachable connection mode. When mopping cleaning is required, the mopping element 1101 is installed on the bottom of the robot body 101. When sweeping cleaning is required, the mopping element 1101 is replaced by the side brush 1102. The side brush 1102 is installed on the bottom of the robot body 101.

The walking unit 106 is a component related to a movement of the cleaning robot 100. The walking unit 106 includes a drive wheel 1061 and a universal wheel 1062. The universal wheel 1062 and the drive wheel 1061 cooperate to realize the steering and movement of the cleaning robot 100. At a position near a rear part of the bottom of the robot body 101, two drive wheels 1061 are provided on the left and right sides, respectively. The universal wheel 1062 is provided on a center line of the bottom of the robot body 101 and located between the two cleaning elements.

Each of the drive wheels 1061 is provided with a drive wheel motor. The drive wheel 1061 rotates under the driving of the drive wheel motor. After the drive wheel 1061 rotates, it drives the cleaning robot 100 to move. The steering angle of the cleaning robot 100 can be controlled by controlling a difference between a rotation speed of a right drive wheel 1061 and a rotation speed of a left drive wheel 1061.

FIG. 5 is another schematic structural diagram of the cleaning robot 100 shown in FIG. 1.

The controller 104 is provided inside the robot body 101. The controller 104 is configured for controlling the cleaning robot 100 to execute specific operations. The controller 104 may be, for example, a Central Processing Unit (CPU), or a Microprocessor, etc. As shown in FIG. 5, the controller 104 is electrically connected with components such as the battery 105, the memory 107, the drive motor 102, the walking unit 106, the sensor unit 103, and the robot interaction unit 109 to control these components.

The battery 105 is provided inside the robot body 101. The battery 105 is configured for providing power to the cleaning robot 100.

The robot body 101 is also provided with the charging component 111, which is configured for obtaining power from external devices of the cleaning robot 100 to charge the battery 105.

The memory 107 is provided on the robot body 101. A program is stored on the memory 107 and is executed by the controller 104 to realize corresponding operations. The memory 107 is also configured for storing parameters used by the cleaning robot 100. The memory 107 includes, but is not limited to, a magnetic disk memory, a CD-ROM (Compact Disc Read-Only Memory), an optical memory, etc.

The communication unit 108 is provided on the robot body 101. The communication unit 108 is configured for allowing the cleaning robot 100 to communicate with external devices. The communication unit 108 includes, but is not limited to, a wireless fidelity (WI-Fidelity, WI-FI) communication module 1081 and a short distance communication module 1082, etc. The cleaning robot 100 can be connected with a WI-FI router through the WI-FI communication module 1081 to communicate with a terminal. The cleaning robot 100 communicates with the base station through the short distance communication module 1082. The base station is a device that cooperates with the cleaning robot 100.

The sensor unit 103 provided on the robot body 101 includes various types of sensors, such as a laser radar 1031, a collision sensor 1032, a distance sensor 1033, a drop sensor 1034, a counter 1035, and a gyroscope 1036, etc.

The laser radar 1031 is provided on the top of the robot body 101. When working, the laser radar 1031 rotates and a transmitter on the laser radar 1031 emits a laser signal. The laser signal is reflected by an obstacle, so that a receiver of the laser radar 1031 receives the reflected laser signal reflected by the obstacle. A circuit unit of the laser radar 1031 can obtain a surrounding region environment information by analyzing the received laser signal, such as a distance and angle of the obstacle relative to the laser radar 1031.

The collision sensor 1032 includes a collision housing 10321 and a trigger sensor 10322. The collision housing 10321 surrounds a head of the robot body 101. Specifically, the collision housing 10321 is provided at a front position of the head and on left and right sides of the robot body 101. The trigger sensor 10322 is provided inside the robot body 101 and behind the collision housing 10321. An elastic buffer is provided between the collision housing 10321 and the robot body 101. When the collision housing 10321 of the cleaning robot 100 collides with the obstacle, the collision housing 10321 moves toward inside of the cleaning robot 100 and compresses the elastic buffer. After the collision housing 10321 moves a certain distance toward the inside of the cleaning robot 100, the collision housing 10321 contacts the trigger sensor 10322 to trigger the trigger sensor 10322 to generate a signal, which can be sent to the controller 104 inside the robot body 101 for processing. After hitting the obstacle, the cleaning robot 100 moves away from the obstacle. Under an action of the elastic buffer, the collision housing 10321 moves back to an original position. It can be seen that the collision sensor 1032 can detect obstacles and plays a buffer role when it collides with obstacles.

The distance sensor 1033 may specifically be an infrared detection sensor, which can be configured for detecting a distance from an obstacle to the distance sensor 1033. The distance sensor 1033 is provided on a lateral side of the robot body 101, so that the distance sensor 1033 can detect a distance value from an obstacle located near the side of the cleaning robot 100 to the distance sensor 1033.

The drop sensor 1034 is provided at an edge of the bottom of the robot body 101. A number of the drop sensor 1034 can be one or more. When the cleaning robot 100 moves to the edge of the floor, the drop sensor 1034 can detect that the cleaning robot 100 is at risk of dropping from a height, so as to execute a corresponding anti-drop response, for example, the cleaning robot 100 stops moving or moves away from the dropping position, etc.

The counter 1035 and the gyroscope 1036 are also provided inside the robot body 101. The counter 1035 is configured for accumulating a total rotation angle of the drive wheel 1061 to calculate a distance of the driving wheel 1061 drives the cleaning robot 100 to move. The gyroscope 1036 is configured for detecting the rotation angle of the cleaning robot 100, so that an orientation of the cleaning robot 100 can be determined.

The robot interaction unit 109 is provided on the robot body 101. Users can interact with the cleaning robot 100 through the robot interaction unit 109. The robot interaction unit 109 includes components such as a switch button 1091 and a speaker 1092. The users can control the cleaning robot 100 to start or stop working by pressing the switch button 1091. The cleaning robot 100 may play a prompt sound to the users through a speaker 1092.

It should be understood that the cleaning robot 100 described in the embodiments of the present application is only a specific example, and does not specifically define the cleaning robot 100 in the embodiments of the present application. The cleaning robot 100 in the embodiments of the present application may also be other specific implementations. For example, in other implementations, the cleaning robot may have more or fewer components than the cleaning robot 100 shown in FIG. 1.

In the embodiment of the present application, the detection method applied to a mobile robot to detect a region environment for drawing an entire region environment map, where the mobile robot is provided with a detection sensor, the mobile robot gradually expands the region environment map by a combination of a detection of the detection sensor with a behavior path plan of the mobile robot until an entire region environment map is finally generated. A region which has been detected by the detection sensor is a detected region, a region which has not been detected by the detection sensor is an undetected region. The detection method provided by the present application will be described in detail in the following through each of embodiments in conjunction with the drawings.

Embodiment 1

FIG. 6 is a flow diagram of a detection method according to an exemplary embodiment. This embodiment takes the detection method being applied to a mobile robot as an example for illustration. The detection method may include the following steps:

Step S1, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

Figure 7:
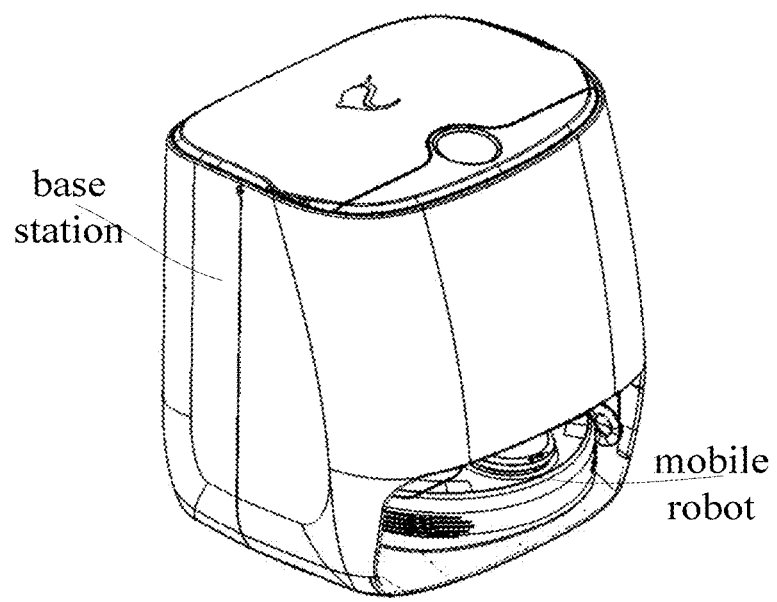
FIG. 7 is a schematic diagram of a base station according to an exemplary embodiment.

In daily life, mobile robots such as cleaning robots can detect the region environment through their own detection sensors before cleaning the floor of the region environment. In the implementation, the mobile robot can detect the region environment multiple times. Please refer to FIG. 7, before detecting the region environment, the mobile robot can park in the base station cooperated with the mobile robot. As an example, the base station can be parked in a position close to the wall in the region environment. In a first detection, the mobile robot drives out of the base station, and moves a certain distance toward a certain direction and detects the region environment through its own detection sensors during the movement to obtain initial detection data. The mobile robot draws the first region environment map according to the initial detection data. Specifically, the outer contour of the region environment is drawn in the first region environment map according to the initial detection data.

The detection sensor described in the embodiment of the present application is the laser radar. The mobile robot further includes a non-laser radar detection sensor. The detection data includes data detected by the laser radar and data detected by the non-laser radar detection sensor.

Figure 8:
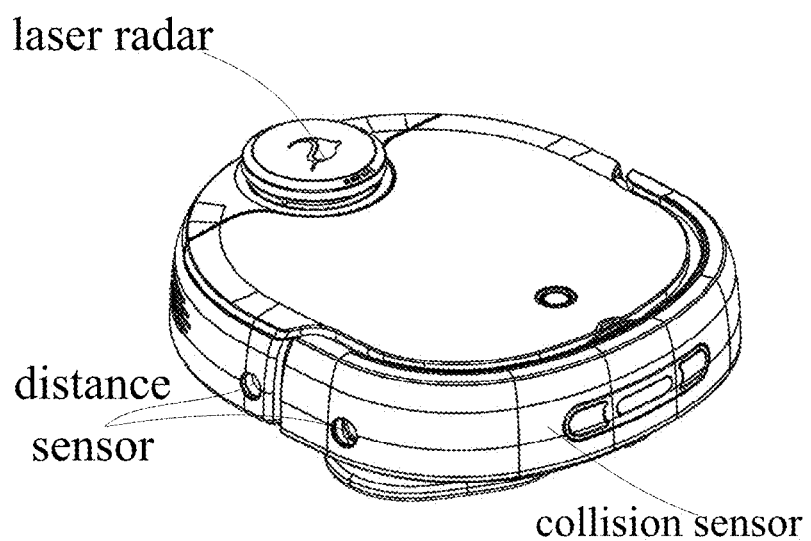
FIG. 8 is a schematic structural diagram of a mobile robot according to still another exemplary embodiment.
Figure 9:
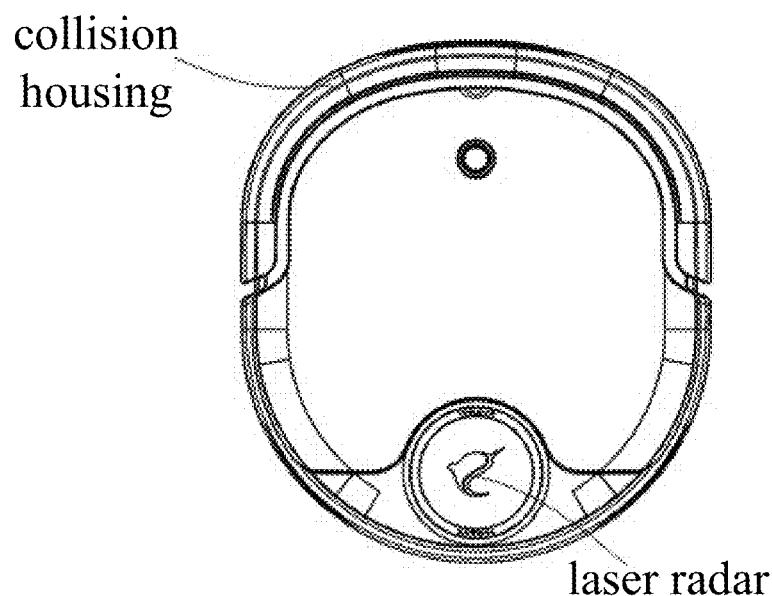
FIG. 9 is a schematic structural diagram of a mobile robot according to still another exemplary embodiment.

Please refer to FIG. 8, the method of the mobile robot detecting the region environment may include a detection by the laser radar, a detection by the non-laser radar detection sensors, etc. Specifically, the laser radar is provided on the top of the robot. The laser radar can emit laser signals and receive reflected laser signals to detect obstacles in the region environment. The laser radar can be a laser radar that detects two-dimension information or three-dimension information. In some embodiments, the above-mentioned non-laser radar detection sensor can be a distance sensor, a collision sensor, etc. Please refer to FIG. 9, the collision sensor is provided on a head of the mobile robot. The collision sensor may include a collision housing and a trigger sensor. The collision housing can elastically expand and contract with respect to a body of the mobile robot. When the collision housing collides with the obstacle, it will trigger the trigger sensor provided in the body of the mobile robot to generate a trigger signal. The distance sensor is provided on a side wall of the mobile robot. The distance sensor is configured for measuring a distance to the obstacle, for example, the distance sensor can be an infrared distance sensor.

In this embodiment, the laser radar is mainly used for detection, and non-laser radar detection sensor is used as a supplement. The non-laser radar sensor can be used to detect obstacles that the laser radar cannot detect, such as obstacles located under a detection plane of the laser radar, a glass, a marble, etc. The detection data obtained by the laser radar includes obstacle information and passable region information. The obstacle information is used to indicate a position of the obstacle. The passable region information is used to indicate a passable region. A region between the obstacle and the laser radar (that is, a region where a laser light is not reflected) is the passable region. The detection data detected by the non-laser radar detection sensor includes the obstacle information.

Step S2, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor.

Due to a detection range of the mobile robot detecting a region environment for one time is limited, the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

Figure 10:
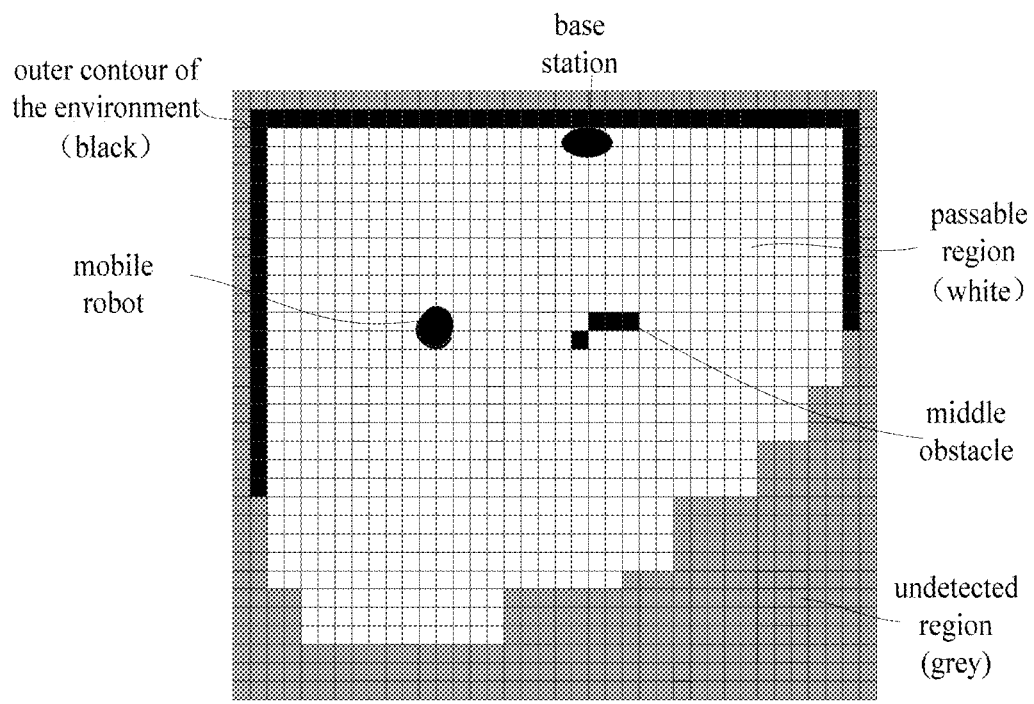
FIG. 10 is a schematic diagram of a region environment map according to an exemplary embodiment.

In some embodiments, the first region environment map includes a detected region and an undetected region. The detected region is a region detected by the detection sensor. The undetected region is a region not detected by the detection sensor. The detected region includes a passable region, which represents a region where the mobile robot can pass. Please refer to FIG. 10, FIG. 10 is a schematic diagram of a first region environment map according to an exemplary embodiment. The detected region in the first region environment map is specifically a region detected by the mobile robot through the laser radar and/or the non-laser radar detection sensor. The detected region includes the outer contour of the region environment and the passable region. Further, the detected region may also include mobile robots, base stations, and middle obstacles, that is, in drawing the first region environment map, the mobile robot can identify a position of the base station. As mentioned above, before executing a detection, the robot is parked in the base station, thus the position of the base station can be determined according to a distance and angle that the mobile robot has moved, thereby marking the position of the base station on the first region environment map. In addition, the undetected region is the region not detected by the mobile robot. The mobile robot cannot determine whether the undetected region is a passable region or a region locating a obstacle. Due to a detection range of the laser signal of the laser radar is limited, the laser radar cannot detect the region environment outside the detection range. When the laser signal of the laser radar is blocked by the obstacle, the laser radar cannot detect a region behind the obstacle. These regions which the laser radar cannot detect are undetected regions.

Figure 11:
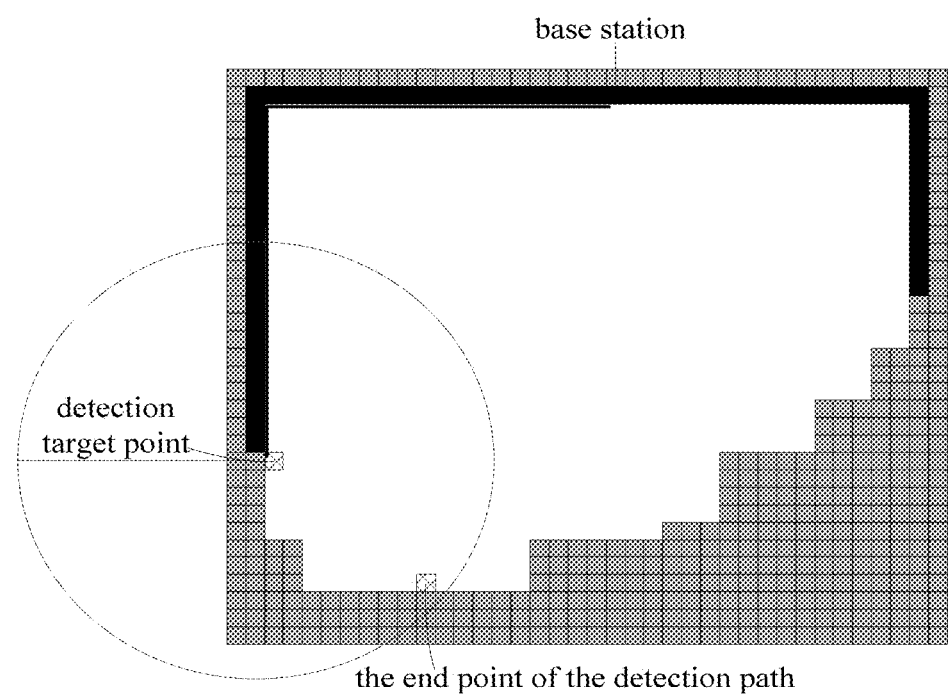
FIG. 11 is a schematic diagram of a region environment map according to another exemplary embodiment.

The mobile robot determines the detection target point in the first region environment map. Exemplarily, the detection target point is shown in FIG. 11. the end point of the first detection path is determined based on the detection target point. The distance between the end point of the first detection path and the detection target point does not exceed the detection range of the detection sensor to ensure that the mobile robot can detect the detection target point when the mobile robot is at the end point of the first detection path. Exemplarily, in a reference hour-hand direction, the end point of the first detection path is before the detection target point, the reference hour-hand direction can be a clockwise direction or a counterclockwise direction. After that, the first detection path is generated based on the end point of the first detection path and the start point of the first detection path.

Step S3, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

After the mobile robot generates the first detection path, it moves along the first detection path from the start point of the first detection path, and continues to detect the region environment by the detection sensor during the movement to obtain a second detection data. Further, the second detection data may also include data detected by non-laser radar detection sensors. After that, the mobile robot adopts the detection data obtained in the second detection to update the first region environment map obtained in the first detection, thereby obtaining the second region environment map.

Step S4, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing an operation of determining a region environment map until the mobile robot detects that the entire region environment map is drawn.

During the movement of the mobile robot along the first detection path, when detecting that the path detection is over, it means that this detection is over. The mobile robot takes the end point of the first detection path as the start point of the second detection path and generates a next detection path based on the second region environment map, that is, the second detection path is generated. In the implementation, the mobile robot determines a next detection target point based on the second region environment map, and then determines an end point of the second detection path based on the next detection target point. The mobile robot takes the end point of the first detection path as the start point of the second detection path to generate the second detection path between the start point of the second detection path and the end point of the second detection path. Then the mobile robot continues to move along the second detection path and detects with the detection sensor during the movement to obtain detection data. The mobile robot updates the second region environment map based on the detection data to obtain a third region environment map. When the mobile robot detects that the entire region environment map is not drawn, it continues to generate a next detection path based on the third region environment map, and determines a fourth region environment map based on the next detection path, until the mobile robot generates a nth region environment map and detects that the entire region environment map is drawn, all operations end. The nth region environment map is determined as the region environment map of the region environment. The nth region environment map includes an outer contour of the region environment detected by the mobile robot during the nth movement and an outer contour of the n-1th region environment map.

The mobile robot is configured to move along the outer contour while keeping a certain distance from the outer contour and/or moves along an edge of the outer contour when moving according to the detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

In the embodiment of the present application, the mobile robot determines a first region environment map with the detection sensor detecting the region environment, the first region environment map includes the outer contour of the detected region and the undetected region. The detection target point corresponding to a position needed to be detected is determined according to the first region environment map. The end point of the first detection path of the first detection path is determined based on the detection target point. In such way, the first detection path is generated based on a current position of the mobile robot when detecting the first region environment map and the end point of the first detection path. The mobile robot moves along the first detection path and obtains the detection data detected by the detection sensor during the movement. When it is detected the path detection is over, a next detection path is determined based on the obtained detection data, that is, the second detection path is determined, and the second region environment map is obtained by executing a detection operation based on the second detection path. In such way, an operation of determining the detection path to generate the region environment map is executed cyclically to gradually expand the region environment map until the mobile robot detects that the entire region environment map is drawn. The mobile robot detects the region environment based on the generated detection path every time, thereby avoiding a problem of repeating detection of the detected region when the mobile robot goes back and forth to the base station, which improves work efficiency. In addition, the mobile robot does not need to traverse all passable regions, thereby reducing the time-consuming for mapping of the mobile robot.

Embodiment 2

Please refer to FIG. 2, in another example, the detection method can include the following implementation process:

Step 1201, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against a wall and a free obstacle, the free obstacle being an obstacle that is less than or equal to a body width of the mobile robot from any other obstacle on the outer contour of the region environment.

The specific implementation can refer to above the step S1 of the embodiment shown in FIG. 6.

As an example, when a distance between a free obstacle and the obstacle at the outer contour of the region environment is less than a distance threshold, the region between the two obstacles is set as a warning region, the outer contour of the region environment also includes the warning region.

The distance threshold can be set by users according to the actual requirement, or can be set by the mobile robot by default, which is not limited in the embodiments of the present application. For example, the distance threshold can be set to be 1.5 times of a width of the mobile robot.

The warning region is a region that needn't to be detected. When the distance between the free obstacle and the obstacle at the outer contour of the region is less than the distance threshold, the mobile robot cannot drive to the region, thus the region can be set as the warning region. The warning region together with the free obstacle and the obstacle at the outer contour of the region environment constitute the outer contour of the region environment.

Step 1202, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor.

Due to a detection range of the mobile robot detecting a region environment for one time is limited, the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiment, the first region environment map is a grid map. The first region environment map includes the detected region and the undetected region. The detected region is a region that has been detected by the detection sensor. The undetected region is a region that has not been detected by the detection sensor. The detected region includes a passable region, which represents a region where the mobile robot can pass.

Please refer to FIG. 11, FIG. 11 is a schematic diagram of a first region environment map according to an exemplary embodiment. The first region environment map is a grid map. Grids of the grid map can represent the detected region and the undetected region. The detected region in the first region environment map is specifically a region detected by the mobile robot through the laser radar and/or the non-laser radar detection sensor. The detected region includes the outer contour of the first region environment and the passable region. Further, the detected region may also include the mobile robot, the base station, and middle obstacles, that is, in drawing the first region environment map, the mobile robot can identify a position of the base station. As mentioned above, before executing a detection, the robot is parked in the base station, thus the position of the base station can be determined according to a distance and angle that the mobile robot has moved, thereby marking the position of the base station on the first region environment map. In addition, the undetected region is the region not detected by the mobile robot. The mobile robot cannot determine whether the undetected region is the passable region or a region locating an obstacle. Due to a detection range of the laser signal of the laser radar is limited, the laser radar cannot detect the region environment outside the detection range, and when the laser signal of the laser radar is blocked by the obstacle, the laser radar cannot detect a region behind the obstacle. These regions which the laser radar cannot detect are the undetected regions.

The mobile robot determines the detection target point in the grids which represent obstacles at the edge based on the first region environment map. As an example, the detection target point is a point in the grid at the junction of the detected region and the undetected region. After the mobile robot determines the detection target point, the mobile robot can determine the detection range of the detection sensor by taking the detection target point as a center, and then determines the end point of the first detection path within the detection range. Exemplarily, the mobile robot can take any one of the determined points within the detection range as the start point of the first detection path. The mobile robot takes its current position when detecting the first detection environment map as the start point of the detection path to generate the detection path between the start point of the first detection path and the end point of the first detection path. The current position of the mobile robot when detecting the first detection environment is also the position where the mobile robot draws the first region environment map according to the first detected data.

Step 1203, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

After the mobile robot generates the first detection path, it moves along the first detection path from the start point of the first detection path, and continues to detect the region environment with the detection sensor during the movement to obtain second detection data. Further, the second detection data may also include data detected by non-laser radar detection sensors. After that, the mobile robot adopts the detection data obtained in the second detection to update the first region environment map obtained in the first detection, thereby obtaining the second region environment map.

Step 1204, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and the outer contour of the second region environment map, loop executing an operation of determining the region environment map until the mobile robot detects that the entire region environment map is drawn.

During the movement of the mobile robot along the first detection path, when detecting that the path detection is over, it means that this detection is over. The mobile robot takes the end point of the first detection path as the start point of the second detection path and generates a next detection path based on the second region environment map, that is, the second detection path is generated. In the implementation, the mobile robot determines a next detection target point based on the second region environment map, and then determines an end point of the second detection path based on the next detection target point. The mobile robot takes the end point of the first detection path as the start point of the second detection path to generate the second detection path between the start point of the second detection path and the end point of the second detection path. Then the mobile robot continues to move along the second detection path and detects with the detection sensor during the movement to obtain detection data. The mobile robot updates the second region environment map based on the detection data to obtain a third region environment map. When the mobile robot detects that the entire region environment map is not drawn, it continues to generate a next detection path based on the third region environment map, and determines a fourth region environment map based on the next detection path, until the mobile robot generates a nth region environment map and detects that the entire region environment map is drawn, all operations end. The nth region environment map is determined as the region environment map of the region environment. The nth region environment map includes an outer contour of the region environment detected by the mobile robot during the nth movement and an outer contour of the (n−1)th region environment map.

The mobile robot is configured to move along the outer contour while keeping a certain distance from the outer contour and/or moves along an edge of the outer contour when moving according to the detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 3

FIG. 13 is a flow diagram of a detection method according to an exemplary embodiment. This embodiment takes the detection method being applied to a mobile robot as an example for illustration. The detection method may include the following steps:

Step 1301, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6.

Step 1302, extracting the outer contour of the region environment and the undetected region from the first region environment map to form a detection map, and determining a detection start point in the detection map.

Figure 14:
FIG. 14 is a schematic diagram of an outer contour of a region environment according to an exemplary embodiment.
Figure 15:
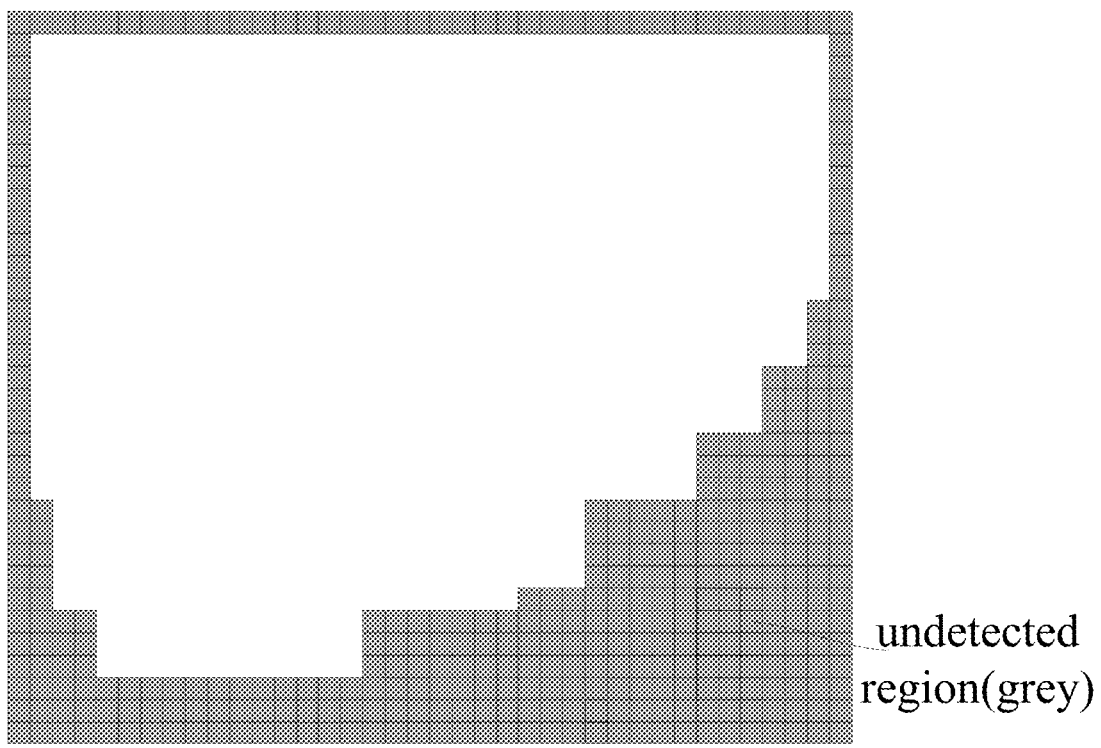
FIG. 15 is a schematic diagram of an undetected region according to an exemplary embodiment.
Figure 16:
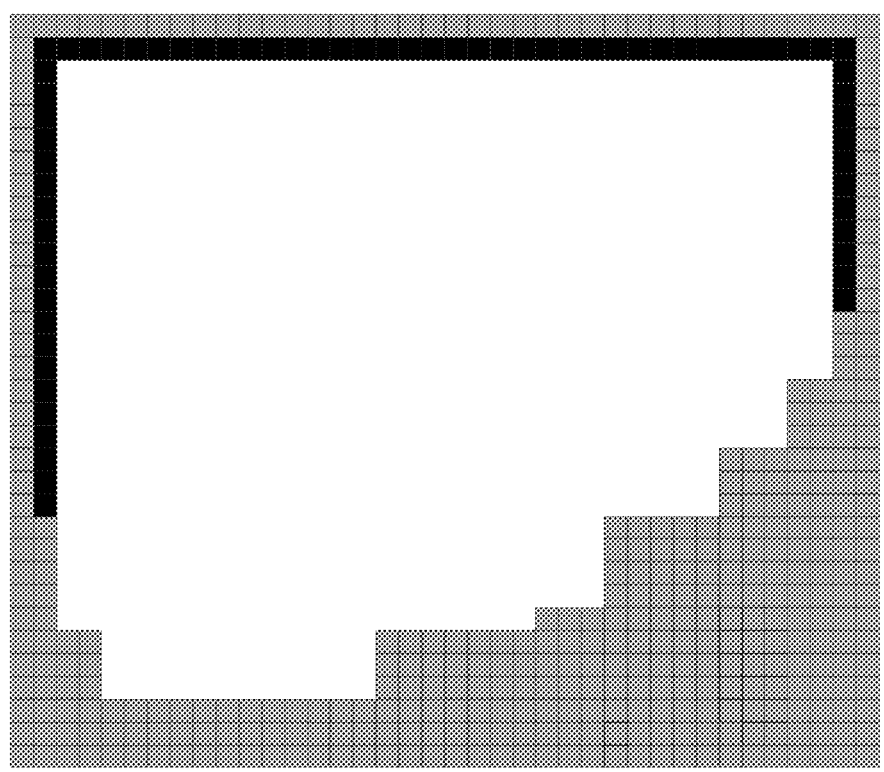
FIG. 16 is a schematic diagram of a merged map according to an exemplary embodiment.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map and determines the detection start point in the detection map.

It is worth mentioning that the detection map includes grids representing the outer contour of the region environment and grids of the undetected region, which can avoid the interference of middle obstacles and improve the efficiency of determining the detection path.

Step 1303, starting from the detection start point, traversing the outer contour of the region environment in the detection map along a clockwise or counterclockwise direction to query a first point located at the junction of the detected region and the undetected region as the detection target point.

In the implementation, the mobile robot executes a detection along a fixed direction. The fixed direction can be set according to the actual requirement, for example, the fixed direction can be the clockwise direction or the counterclockwise direction, which is not limited in embodiments of the present application.

Here the counterclockwise direction is taken as an example. The mobile robot starts from the determined detection start point and traverses the outer contour of the region environment in the detection map along the counterclockwise direction. When finding a first point located at the junction of the detected region and the undetected region, the mobile robot determines the first point as the detection target point (as shown in FIG. 11).

It should be noted that the above steps 1302 and 1303 are applied to implement step S2: determining a detection target point based on the first region environment map.

Step 1304, generating a first detection path based on the detection target point, the first detection path configured for guiding a movement of the mobile robot, the first detection path comprising a start point of the first detection path and an end point of the first detection path, the start point of the first detection path being a current position of the mobile robot when detecting the first region environment map, a distance between the end point of the first detection path and the detection target point not exceeding the detection range of the detection sensor.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiment, the first region environment map is a grid map. The first region environment map includes a detected region and an undetected region. The detected region is a region that has been detected by the detection sensor. The undetected region is a region that has not been detected by the detection sensor. The detected region includes a passable region, which represents a region where the mobile robot can pass.

Please refer to FIG. 11, FIG. 11 is a schematic diagram of the first region environment map according to an exemplary embodiment. The first region environment map is a grid map. Grids of the grid map can represent the detected region and the undetected region. The detected region in the first region environment map is specifically a region detected by the mobile robot through the laser radar and/or the non-laser radar detection sensor. The detected region includes the outer contour of the first region environment and the passable region. Further, the detected region may also include the mobile robot, the base station, and middle obstacles, that is, in drawing the first region environment map, the mobile robot can identify a position of the base station. As mentioned above, before executing a detection, the robot is parked in the base station, thus the position of the base station can be determined according to a distance and angle that the mobile robot has moved, thereby marking the position of the base station on the first region environment map. In addition, the undetected region is the region that has been not detected by the mobile robot. The mobile robot cannot determine whether the undetected region is a passable region or a region locating an obstacle. Due to the detection range of the laser signal of the laser radar is limited, the laser radar cannot detect the region environment outside the detection range. When the laser signal of the laser radar is blocked by an obstacle, the laser radar cannot detect a region behind the obstacle. Regions that the laser radar cannot detect are undetected regions.

The mobile robot determines the detection target point in the grids which represent obstacles at the edge based on the first region environment map. As an example, the detection target point is a point in the grid at the junction of the detected region and the undetected region. After the mobile robot determines the detection target point, the mobile robot can determine the detection range of the detection sensor by taking the detection target point as a center, and then determines the end point of the first detection path within the detection range. Exemplarily, the mobile robot can take any one of the determined points within the detection range as the start point of the first detection path. The mobile robot takes its current position as the start point of the detection path to generate the detection path between the start point of the detection path and the end point of the detection path.

Step 1305, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

After the mobile robot generates the first detection path, it moves along the first detection path from the start point of the first detection path, and continues to detect the region environment with the detection sensor during the movement to obtain second detection data. Further, the second detection data may also include data detected by non-laser radar detection sensors. That is, during the movement of the mobile robot, it detects the region environment with the detection sensor. As mentioned above, the mobile robot mainly adopts the equipped laser radar to detect the region environment. Further, due to some obstacles cannot be detected by the laser radar, such as a glass, a marble, or obstacles located under a detection plane of the laser radar. In some cases, these obstacles that cannot be detected by the laser radar may be located in the first detection path. Therefore, when the mobile robot moves along the first detection path, it may collide with obstacles. When the mobile robot collides with obstacles in the first detection path, other non-laser radar detection sensors can be used to detect these obstacles to get these obstacles' information. That is, the detection data includes data detected by the laser radar and data detected by the non-laser radar sensor. After that, the mobile robot adopts the detection data obtained in the second detection to update the first region environment map obtained in the first detection, thereby obtaining the second region environment map.

Step S1306, in response to detecting that path detection executed by the mobile robot is over, taking the end point of the first detection path as a start point of a second detection path and generating the second detection path based on the second region environment map, determining a third region environment map according to the second detection path, the third region environment map including an outer contour of the region environment detected by the mobile robot during a movement according to the second detection path and the outer contour of the second region environment map, loop executing an operation of determining the region environment map until the mobile robot detects that the entire region environment map is drawn.

The specific implementation please refer to the step 1204 of the embodiment shown in FIG. 12.

The mobile robot is configured to move along the outer contour while keeping a certain distance from the outer contour and/or moves along an edge of the outer contour when moving according to the detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 4

FIG. 17 is a detection method according to the Exemplary embodiment. The detection method can be applied to the above mobile robot, the method includes:

Step 1701, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6, or refer to the step 1201 of the embodiment shown in FIG. 12.

Step 1702, extracting the outer contour of the region environment and the undetected region from the first region environment map to form a detection map, and determining a detection start point in the detection map.

Figure 18:
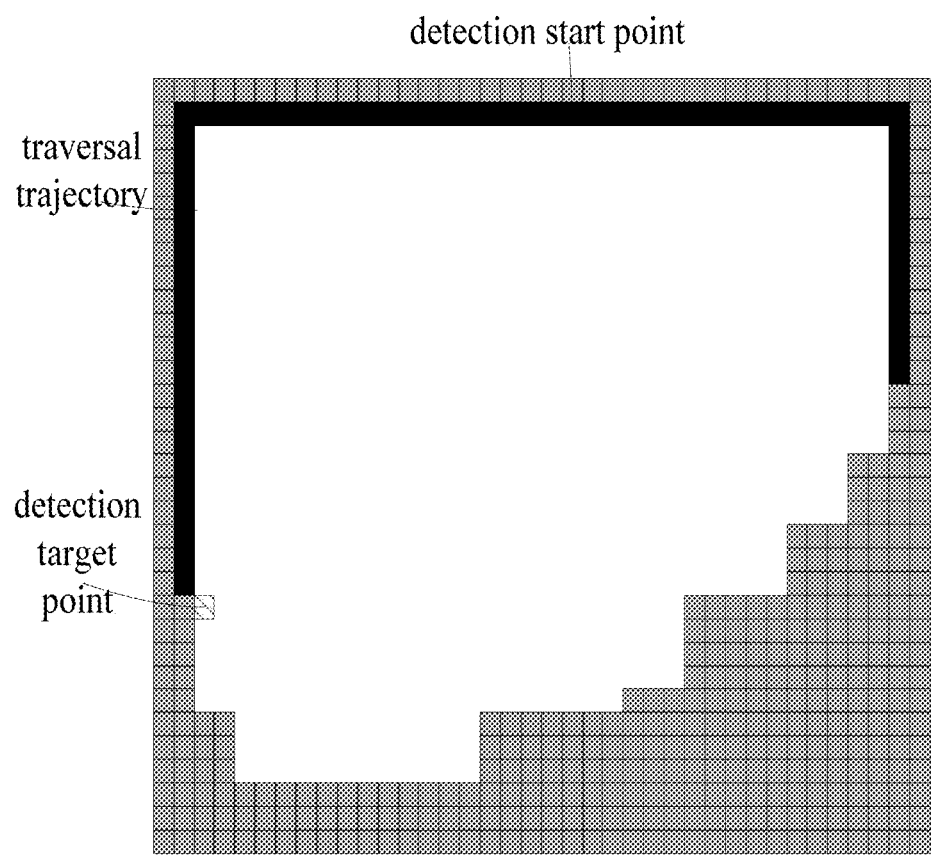
FIG. 18 is a schematic diagram of a detection map according to an exemplary embodiment.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map. The mobile robot determines the detection start point in the detection map. As an example, the mobile robot can determine a fixed position in the outer contour of the region environment in the detection map as the detection start point (as shown in FIG. 18). The fixed position can be set according to the actual requirement.

It is worth mentioning that the detection map includes grids representing the outer contour of the region environment and grids of the undetected region, which can avoid the interference of middle obstacles and improve the efficiency of determining the detection path.

Step 1703, starting from the detection start point, traversing the outer contour of the region environment in the detection map along a clockwise or counterclockwise direction to query a first point located at the junction of the detected region and the undetected region as the detection target point.

In the implementation, the mobile robot executes the detection along a fixed direction. The fixed direction can be set according to the actual requirement, for example, the fixed direction can be the clockwise direction or the counterclockwise direction, which is not limited in embodiments of the present application.

Here the counterclockwise direction is taken as an example. The mobile robot starts from the determined detection start point and traverses the outer contour of the region environment in the detection map along the counterclockwise direction. When finding a first point located at the junction of the detected region and the undetected region, the mobile robot determines the first point as the detection target point (as shown in FIG. 18).

It should be noted that the above steps 1702 and 1703 are applied to implement step S2: determining a detection target point based on the first region environment map.

Step 1704, taking the detection target point as a center to determine the end point of the first detection path within the detection range of the mobile robot, the distance between the detection target point and the end point of the first detection path not exceeding the detection range of the sensor of the mobile robot, such that the mobile robot is capable of detecting the detection target point at the end point of the first detection path.

As an example, the mobile robot takes the detection target point as the center and takes the detection range of the mobile robot as a radius to make a circle to determine a range. Due to the detection target point is located within the range, thus the detection target point can be directly determined as the end point of the first detection path, that is, the end point of the first detection path and the detection target point can be the same point.

Step 1705, generating the first detection path by taking the start point of the first detection path as a start point and taking the end point of the first detection path as an end point.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot. In some embodiments, the mobile robot takes its' current position when detecting the first region environment map as the start point and takes the detection target point as the end point to generate a path between the two points to obtain the first detection path.

Step 1706, during a movement of the mobile robot according to the first detection path, obtaining a second region environment map through the detection sensor detecting a region environment, the second region environment map comprising an outer contour of a region environment detected by the mobile robot during the movement and the outer contour of the first region environment map.

After the mobile robot generates the first detection path, it moves along the first detection path from the start point of the first detection path, and continues to detect the region environment by the detection sensor during the movement to obtain second detection data. Further, the second detection data may also include data detected by non-laser radar detection sensors. After that, the mobile robot adopts the detection data obtained in the second detection to update the first region environment map obtained in the first detection, thereby obtaining the second region environment map.

Step 1707, in response to detecting that path detection executed by the mobile robot is over, taking the end point of the first detection path as a start point of a second detection path and generating the second detection path based on the second region environment map, determining a third region environment map according to the second detection path, the third region environment map including an outer contour of the region environment detected by the mobile robot during a movement according to the second detection path and an outer contour of the second region environment map, loop executing an operation of determining the region environment map until the mobile robot detects that the entire region environment map is drawn.

The specific implementation can refer to the step S4 of the embodiment shown in FIG. 6.

The mobile robot is configured to move along the outer contour while keeping a certain distance from the outer contour and/or moves along an edge of the outer contour when moving according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 5

Figure 19:
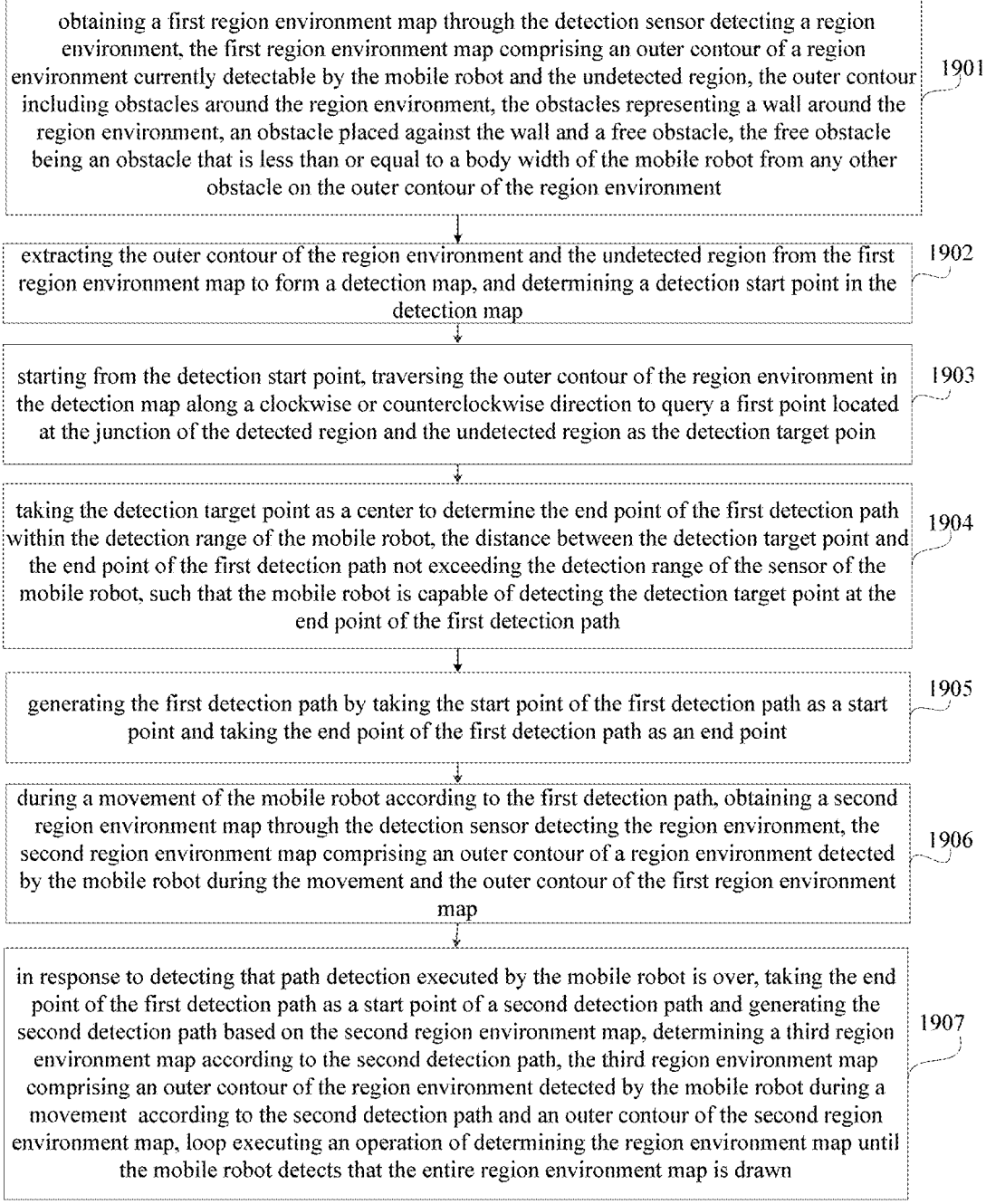
FIG. 19 is a flow diagram of a detection method according to an exemplary embodiment.

FIG. 19 is a detection method according to another Exemplary embodiment.

The detection method can be applied to the above-mentioned mobile robot, the method includes:

Step 1901, obtaining a first region environment map through the detection sensor detecting a region environment, the first region environment map comprising an outer contour of a region environment currently detectable by the mobile robot and the undetected region, the outer contour including obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6, or refer to the step 1201 of the embodiment shown in FIG. 12.

Step 1902, extracting the outer contour of the region environment and the undetected region from the first region environment map to form a detection map, and determining a detection start point in the detection map.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map. The mobile robot determines the detection start point in the detection map. As an example, the mobile robot can determine a fixed position in the outer contour of the region environment in the detection map as the detection start point (as shown in FIG. 18). The fixed position can be set according to the actual requirement.

As an example, the mobile robot starts from a position of the base station and searches along the clockwise or counterclockwise direction. The first point detected on the outer contour of the region environment is the detection start point. That is to say, the point closest to the base station can be obtained as the detection start point. For example, when the mobile robot gradually detects the region environment along the counterclockwise direction, it can determine a first point detected on the outer contour of the region environment along the counterclockwise direction as the detection start point.

It is worth mentioning that the detection map includes grids representing the outer contour of the region environment and grids of the undetected region, which can avoid the interference of middle obstacles and improve the efficiency of determining the detection path.

Step 1903, starting from the detection start point, traversing the outer contour of the region environment in the detection map along a clockwise or counterclockwise direction to query a first point located at the junction of the detected region and the undetected region as the detection target point.

In the implementation, the mobile robot executes a detection along a fixed direction. The fixed direction can be set according to the actual requirement, for example, the fixed direction can be the clockwise direction or the counterclockwise direction, which is not limited in embodiments of the present application.

Here the counterclockwise direction is taken as an example. The mobile robot starts from the determined detection start point and traverses the outer contour of the region environment in the detection map along the counter-clockwise direction. When finding a first point located at the junction of the detected region and the undetected region, the mobile robot determines the first point as the detection target point (as shown in FIG. 18).

It should be noted that the above steps 1902 and 1903 are applied to implement step S2: determining a detection target point based on the first region environment map.

Step 1904, taking the detection target point as a center to determine the end point of the first detection path within the detection range of the mobile robot, the distance between the detection target point and the end point of the first detection path not exceeding the detection range of the sensor of the mobile robot, such that the mobile robot is capable of detecting the detection target point at the end point of the first detection path.

As an example, the mobile robot takes the detection target point as the center and takes the detection range of the mobile robot as a radius to make a circle to determine a range, that is, it should ensure that the distance between the end point of the first detection path and the detection target point does not exceed the detection range of the detection sensor. In some embodiments, please refer to FIG. 20, the mobile robot can take the detection target point as the center and take the detection distance of the detection sensor as the radius to make the circle, and the grid point at the junction of a region defined by the circle and the undetected region is determined as the end point of the first detection path, thereby ensuring that the mobile robot can detect the detection target point and the surrounding region of the detection target point.

It is worth mentioning that the end point of the first detection path is located at the junction of the passable region and the undetected region, and the end point of the first detection path is before the detection target point along the reference hour-hand direction, so that the detection path is close to the known outer contour of the region environment but does not collide with the known outer contour of the region environment.

Step 1905, generating the first detection path by taking the start point of the first detection path as a start point and taking the end point of the first detection path as an end point.

In some embodiment, the mobile robot can take its current position when detecting the first region environment map as the start point and take the detection target point as the end point to generate the path between the two points to obtain the first detection path.

As an example, the start point of the first detection path and the end point of the first detection path are set on the detection map, a length of the first detection path is a length of a shortest path between the current position of the mobile robot when detecting the first region environment map and the end point of the first detection path.

Figure 21:
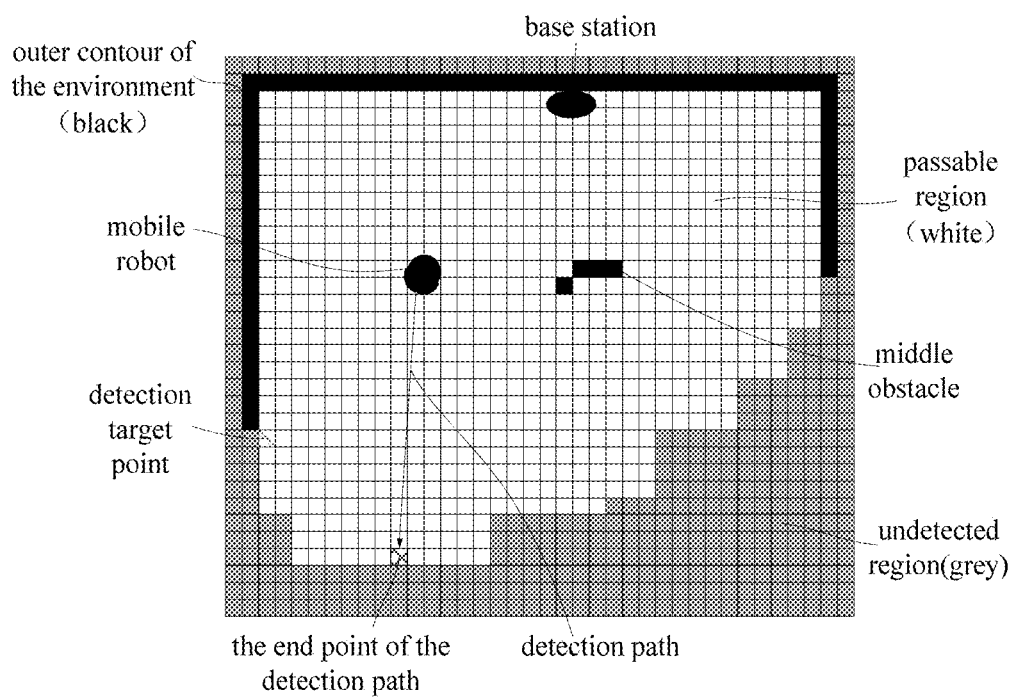
FIG. 21 is a schematic diagram of a region environment map according to an exemplary embodiment.

Exemplarily, the mobile robot can take the start point of the first detection path as the start point and take the end point of the first detection path as the end point to generate the shortest path between the two points to obtain the first detection path, that is to say, a straight line between the start point of the first detection path and the end point of the first detection path can be taken as the first detection path. In one embodiment, the generated first detection path can be shown as FIG. 21.

Step 1906, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

After the mobile robot generates the first detection path, it moves along the first detection path from the start point of the first detection path, and continues to detect the region environment with the detection sensor during the movement to obtain second detection data. Further, the second detection data may also include data detected by non-laser radar detection sensors. After that, the mobile robot adopts the detection data obtained in the second detection to update the first region environment map obtained in the first detection, thereby obtaining the second region environment map.

Step 1907, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and an outer contour of the second region environment map, loop executing an operation of determining the region environment map until the mobile robot detects that the entire region environment map is drawn.

The specific implementation can refer to the step S4 of the embodiment shown in FIG. 6.

The mobile robot is configured to move along the outer contour while keeping a certain distance from the outer contour and/or moves along an edge of the outer contour when moving according to the detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 6

Figure 22:
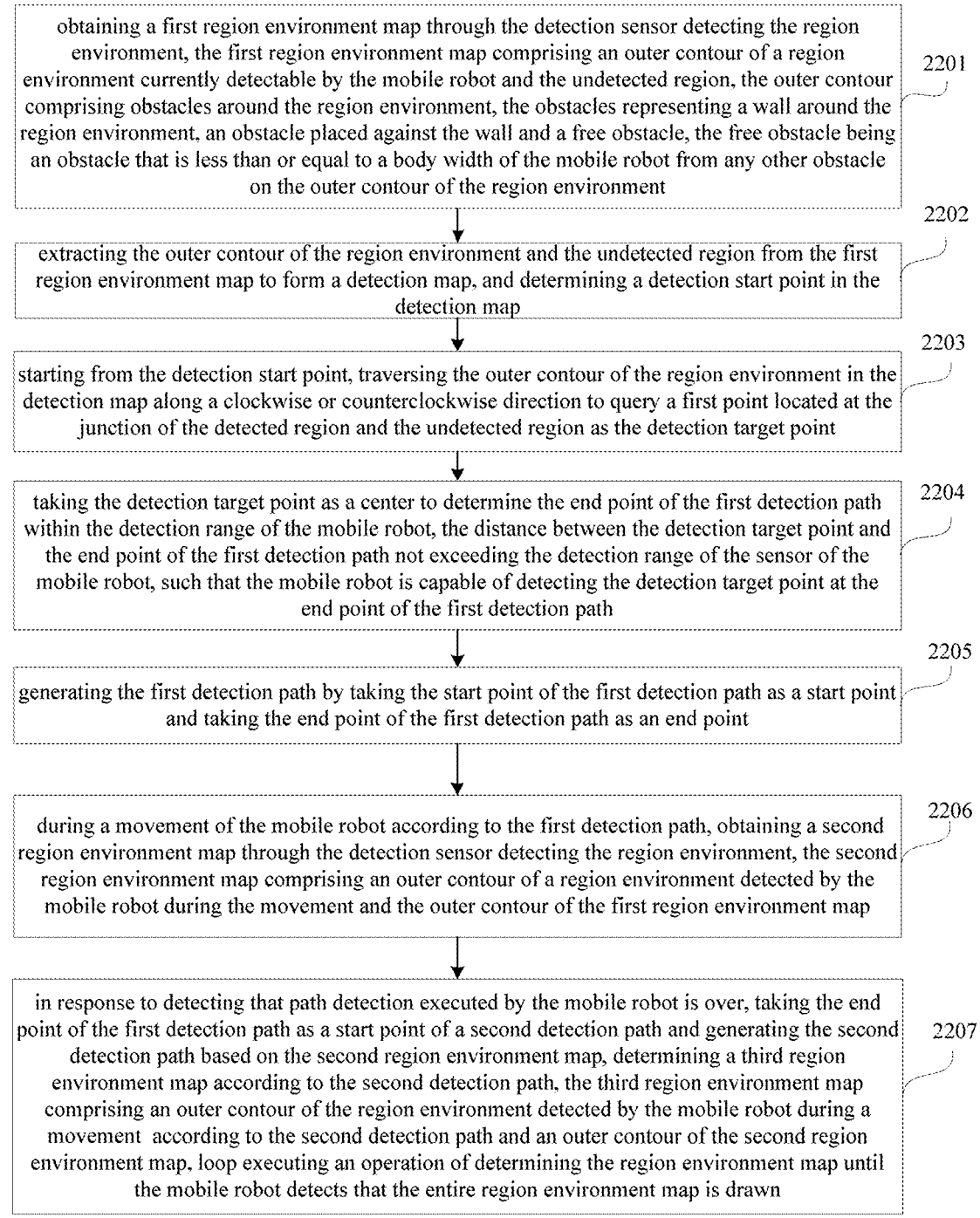
FIG. 22 is a flow diagram of a detection method according to an exemplary embodiment.

FIG. 22 is a detection method according to another Exemplary embodiment.

The detection method can be applied to the above mobile robot, the method includes:

Step 2201, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6, or refer to the step 1201 of the embodiment shown in FIG. 12.

Step 2202, extracting the outer contour of the region environment and the undetected region from the first region environment map to form a detection map, and determining a detection start point in the detection map.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map. The mobile robot determines the detection start point in the detection map. As an example, the mobile robot can determine a fixed position in the outer contour of the region environment in the detection map as the detection start point (as shown in FIG. 18). The fixed position can be set according to the actual requirement.

It is worth mentioning that the detection map includes grids representing the outer contour of the region environment and grids of the undetected region, which can avoid the interference of middle obstacles and improve the efficiency of determining the detection path.

Step 2203, starting from the detection start point, traversing the outer contour of the region environment in the detection map along a clockwise or counterclockwise direction to query a first point located at the junction of the detected region and the undetected region as the detection target point.

In the implementation, the mobile robot executes a detection along a fixed direction. The fixed direction can be set according to the actual requirement, for example, the fixed direction can be the clockwise direction or the counterclockwise direction, which is not limited in embodiments of the present application.

Here the counterclockwise direction is taken as an example. The mobile robot starts from the determined detection start point and traverses the outer contour of the region environment in the detection map along the counterclockwise direction. When finding a first point located at the junction of the detected region and the undetected region, the mobile robot determines the point as the detection target point (as shown in FIG. 18).

It should be noted that the above step S2202 and 2203 are applied to implement step S2: determining a detection target point based on the first region environment map.

Step 2204, taking the detection target point as a center to determine the end point of the first detection path within the detection range of the mobile robot, the distance between the detection target point and the end point of the first detection path not exceeding the detection range of the sensor of the mobile robot, such that the mobile robot is capable of detecting the detection target point at the end point of the first detection path.

As an example, the mobile robot takes the detection target point as the center and takes the detection range of the mobile robot as a radius to make a circle to determine a range. Due to the detection target point is located within the range, thus the detection target point can be directly determined as the end point of the first detection path, that is, the end point of the first detection path and the detection target point can be the same point.

Step 2205, generating the first detection path by taking the start point of the first detection path as a start point and taking the end point of the first detection path as an end point.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiments, the mobile robot can set the start point of the first detection path and the end point of the first detection path on the detection map, a difference value between a length of the first detection path and a length of the shortest path between the two points is within a reference value range.

The start point of the first detection path is taken as the start point and the end point of the first detection path is taken as the end point to generate a curve between the two points to obtain the first detection path, wherein a difference value between a length of the curve and a length of the shortest path is within the reference value range.

The reference value range can be set by users according to the actual requirement or can be set by the mobile robot by default, which is not limited in the embodiments of the present application.

Step 2206, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

After the mobile robot generates the first detection path, it moves along the first detection path from the start point of the first detection path, and continues to detect a region environment with the detection sensor during the movement to obtain second detection data. Further, the second detection data may also include data detected by non-laser radar detection sensors. After that, the mobile robot adopts the detection data obtained in the second detection to update the first region environment map obtained in the first detection, thereby obtaining the second region environment map.

Step 2207, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and an outer contour of the second region environment map, loop executing an operation of determining the region environment map until the mobile robot detects that the entire region environment map is drawn.

The specific implementation can refer to the step S4 of the embodiment shown in FIG. 6.

The mobile robot is configured to move along the outer contour while keeping a certain distance from the outer contour and/or moves along an edge of the outer contour when moving according to the detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 7

FIG. 23 is a detection method according to an exemplary embodiment. The detection method can be applied to the above mobile robot, the method includes the following implementation process:

Step 2301, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6, or refer to the step 1201 of the embodiment shown in FIG. 12.

Step 2302, extracting the outer contour of the region environment and the undetected region from the first region environment map to form a detection map, and determining a detection start point in the detection map.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map. The mobile robot determines the detection start point in the detection map. As an example, the mobile robot can determine a fixed position in the outer contour of the region environment in the detection map as the detection start point (as shown in FIG. 18). The fixed position can be set according to the actual requirement.

As an example, the mobile robot starts from a position of the base station and searches along the clockwise or counterclockwise direction. The first point detected on the outer contour of the region environment is the detection start point. That is to say, the point closest to the base station can be obtained as the detection start point. For example, when the mobile robot gradually detects the region environment along the counterclockwise direction, it can determine the first point detected on the outer contour of the region environment along the counterclockwise direction as the detection start point.

It is worth mentioning that the detection map includes grids representing the outer contour of the region environment and grids of the undetected region, which can avoid the interference of middle obstacles and improve the efficiency of determining the detection path.

Step 2303, starting from the detection start point, traversing the outer contour of the region environment in the detection map along a clockwise or counterclockwise direction to query a first point located at the junction of the detected region and the undetected region as the detection target point.

In the implementation, the mobile robot executes a detection along a fixed direction. The fixed direction can be set according to the actual requirement, for example, the fixed direction can be the clockwise direction or the counterclockwise direction, which is not limited in embodiments of the present application.

Here the counterclockwise direction is taken as an example. The mobile robot starts from the determined detection start point and traverses the outer contour of the region environment in the detection map along the counterclockwise direction. When finding a first point located at the junction of the detected region and the undetected region, the mobile robot determines the point as the detection target point (as shown in FIG. 18).

It should be noted that the above steps 2302 and 2303 are applied to implement step S2: determining a detection target point based on the first region environment map.

Step 2304, taking the detection target point as a center to determine the end point of the first detection path within the detection range of the mobile robot, the distance between the detection target point and the end point of the first detection path not exceeding the detection range of the sensor of the mobile robot, such that the mobile robot is capable of detecting the detection target point at the end point of the first detection path.

As an example, the mobile robot takes the detection target point as the center and takes the detection range of the mobile robot as a radius to make a circle to determine a range. Due to the detection target point is located within the range, thus the detection target point can be directly determined as the end point of the first detection path, that is, the end point of the first detection path and the detection target point can be the same point.

Step 2305, generating the first detection path by taking the start point of the first detection path as a start point and taking the end point of the first detection path as an end point.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to show the mobile robot to move to expand the detection range of the mobile robot.

In some embodiments, the mobile robot can set the start point of the first detection path and the end point of the first detection path on the detection map, a difference value between a length of the first detection path and a length of the shortest path between the two points is within a reference value range.

Certainly, in another embodiment, the start point of the first detection path is taken as the start point and the end point of the first detection path is taken as the end point to generate a curve between the two points to obtain the first detection path, wherein a difference value between a length of the curve and a length of the shortest path is within the reference value range.

The reference value range can be set by users according to the actual requirement or can be set by the mobile robot by default, which is not limited in the embodiments of the present application.

Step 2306, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

After the mobile robot generates the first detection path, it moves along the first detection path from the start point of the first detection path, and continues to detect the region environment with the detection sensor during the movement to obtain second detection data. Further, the second detection data may also include data detected by non-laser radar detection sensors. After that, the mobile robot adopts the detection data obtained in the second detection to update the first region environment map obtained in the first detection, thereby obtaining the second region environment map.

In some embodiment, the specific implementation of updating the first region environment map can include: when information of a position in the detection data is different from the information of the same position in the first region environment map, and an accuracy of the information in the detection data is greater than that of the information in the first region environment map, the information of the position in the detection data is used to replace the original information of the position in the first region environment map. When the first region environment map does not include the information of the detection data, the detection data is used to draw the outer contour of the region environment of the first region environment map. Further, information on obstacles and/or passable regions of the detection data is used to draw the contour information of the region environment to obtain the second region environment map.

Step 2307, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and an outer contour of the second region environment map, loop executing an operation of determining the region environment map until the mobile robot detects that the entire region environment map is drawn.

As an example, the method that the mobile robot detects the path detection is over can include: when the mobile robot moves to the end point of the first detection path, the mobile robot determines that the path detection is over. That is to say, when the mobile robot moves to the end point of the first detection path, that is, a position of the mobile robot overlaps the end point of the first detection path, the mobile robot determines that the path detection is over, and the detection of this time is over.

As an example, the method that the mobile robot detects the entire region environment map is drawn includes: the mobile robot determines that the entire region environment map is drawn when detecting that the outer contour of the region environment is an enclosed obstacle region.

In the implementation, the mobile robot can determine whether the detection of the outer contour of the entire region environment is completed by detecting whether the outer contour of the region environment in the updated region environment map constitutes a closed loop. For example, when the detection start point is both the start point and the end point to form a closed loop, it determines that the detection of the entire region environment is over. Otherwise, the mobile robot continues to determine a next detection path based on the updated region environment map, and executes a next detection operation along the redetermined detection path, the detection is determined to be over until the outer contour of the region environment constitutes the closed loop.

In the process of drawing the region environment map, the mobile robot moves within the region environment to detect the region environment, thereby expanding the region environment map. The mobile robot adopts the drawn region environment map to design the detection path. The start point of the detection path is a grid point corresponding to a position of the mobile robot when it establishes the detection path. A distance between the end point of the detection path and the detection target point is within the detection range of the laser radar, and the detection target point is a point at the junction of the detected region and the undetected region in the current drawn region environment map. In this way, the mobile robot moves along the detection path and can detect the surrounding information of the detection target point.

In addition, the detection target point is updated on the outer contour of the region environment of the detected region along a fixed hour-hand direction, such that the mobile robot can move in a hour-hand direction along the wall of the region environment as a whole and detect the region environment. In this way, the outer contour of the region environment representing the wall of the region environment can be continuously detected, the outer contour of the region environment can be drawn quickly.

The mobile robot is configured to move along the outer contour while keeping a certain distance from the outer contour and/or moves along an edge of the outer contour when moving according to the detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 8

Figure 24:
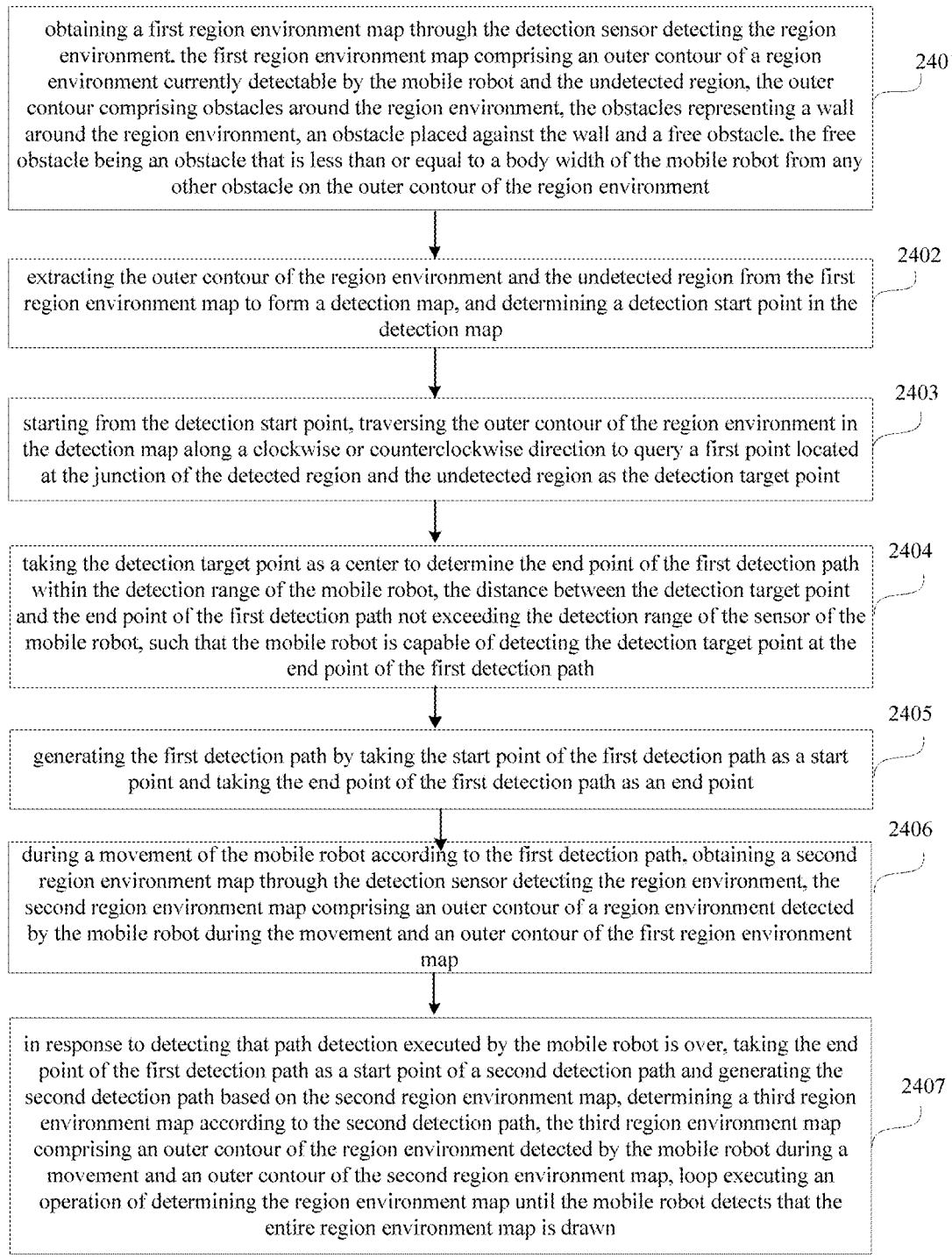
FIG. 24 is a flow diagram of a detection method according to another exemplary embodiment.

Please refer to FIG. 24, FIG. 24 is a detection method according to an exemplary embodiment. The detection method can be applied to the above-mentioned mobile robot, the method includes the following implementation process:

Step 2401, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6, or refer to the step 1201 of the embodiment shown in FIG. 12.

Step 2402, extracting the outer contour of the region environment and the undetected region from the first region environment map to form a detection map, and determining a detection start point in the detection map.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map. The mobile robot determines the detection start point in the detection map. As an example, the mobile robot can determine a fixed position in the outer contour of the region environment in the detection map as the detection start point (as shown in FIG. 18). The fixed position can be set according to the actual requirement.

As an example, the mobile robot starts from a position of the base station and searches along the clockwise or counterclockwise direction. The first point detected on the outer contour of the region environment is the detection start point. That is to say, the point closest to the base station can be obtained as the detection start point. For example, when the mobile robot gradually detects the region environment along the counterclockwise direction, it can determine the first point detected on the outer contour of the region environment along the counterclockwise direction as the detection start point.

It is worth mentioning that the detection map includes grids representing the outer contour of the region environment and grids of the undetected region, which can avoid the interference of middle obstacles and improve the efficiency of determining the detection path.

Step 2403, starting from the detection start point, traversing the outer contour of the region environment in the detection map along a clockwise or counterclockwise direction to query a first point located at the junction of the detected region and the undetected region as the detection target point.

In the implementation, the mobile robot executes the detection along a fixed direction. The fixed direction can be set according to the actual requirement, for example, the fixed direction can be the clockwise direction or the counterclockwise direction, which is not limited in embodiments of the present application.

Here the counterclockwise direction is taken as an example. The mobile robot starts from the determined detection start point and traverses the outer contour of the region environment in the detection map along the counterclockwise direction. When finding a first point located at the junction of the detected region and the undetected region, the mobile robot determines the point as the detection target point (as shown in FIG. 18).

It should be noted that the above steps 2402 and 2403 are applied to implement step S2: determining a detection target point based on the first region environment map.

Step 2404, taking the detection target point as a center to determine the end point of the first detection path within the detection range of the mobile robot, the distance between the detection target point and the end point of the first detection path not exceeding the detection range of the sensor of the mobile robot, such that the mobile robot is capable of detecting the detection target point at the end point of the first detection path.

As an example, the mobile robot takes the detection target point as the center and takes the detection range of the mobile robot as a radius to make a circle to determine a range. Due to the detection target point is located within the range, the detection target point can be directly determined as the end point of the first detection path, that is, the end point of the first detection path and the detection target point can be the same point.

Step 2405, generating the first detection path by taking the start point of the first detection path as a start point and taking the end point of the first detection path as an end point.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiments, the mobile robot can set the start point of the first detection path and the end point of the first detection path on the detection map, a difference value between a length of the first detection path and a length of the shortest path between the two point is within a reference value range.

Certainly, in another embodiment, the start point of the first detection path is taken as the start point and the end point of the first detection path is taken as the end point to generate a curve between the two points to obtain the first detection path, wherein a difference value between a length of the curve and a length of the shortest path is within the reference value range.

The reference value range can be set by users according to the actual requirement or can be set by the mobile robot by default, which is not limited in the embodiments of the present application.

Step 2406, during a movement of the mobile robot according to the first detection path, obtaining a second region environment map through the detection sensor detecting the region environment, the second region environment map comprising an outer contour of a region environment detected by the mobile robot during the movement and an outer contour of the first region environment map.

After the mobile robot generates the first detection path, it moves along the first detection path from the start point of the first detection path, and continues to detect the region environment by the detection sensor during the movement to obtain second detection data. Further, the second detection data may also include data detected by non-laser radar detection sensors. After that, the mobile robot adopts the detection data obtained in the second detection to update the first region environment map obtained in the first detection, thereby obtaining the second region environment map.

Step 2407, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and an outer contour of the second region environment map, loop executing an operation of determining the region environment map until the mobile robot detects that the entire region environment map is drawn.

As an example, the method that in response to detecting that path detection executed by the mobile robot is over can include: determining that the path detection is over when finding that the surrounding of the detection target point in the detected region environment map are all detected region.

When the mobile robot collides with an obstacle during the movement along the first direction path, it can move around an edge of the obstacle. During the movement around the obstacle, if the surrounding of the detection target point are detected regions, or the mobile robot determines that the obstacle is not the outer contour of the region environment, it can determine that the path detection is over, that is, the current detection is over.

After the current detection is over, the mobile robot takes the end point of the first detection path as the start point of the second detection path and generates the second detection path based on the second region environment map, and determines a third region environment map based on the second detection path. The operation of determining the region environment map is cycled according to the above-mentioned method until the mobile robots detects that the entire region environment map is drawn.

As an example, the method that the mobile robot detects the entire region environment map is drawn can include: no detection point is found by the mobile robot.

When the mobile robot cannot find a target detection point in a nth region environment map, that is, the surrounding of the grid of the contour of the region environment are the detected regions, and the grids at the junction of the undetected region and the detected region cannot be found, the mobile robot can determines that the detection of the entire region environment is over, at this time, it can determines that the outer contour of the region environment is an enclosed obstacle region.

The mobile robot is configured to move along the outer contour while keeping a certain distance from the outer contour and/or moves along an edge of the outer contour when moving according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 9

Figure 25:
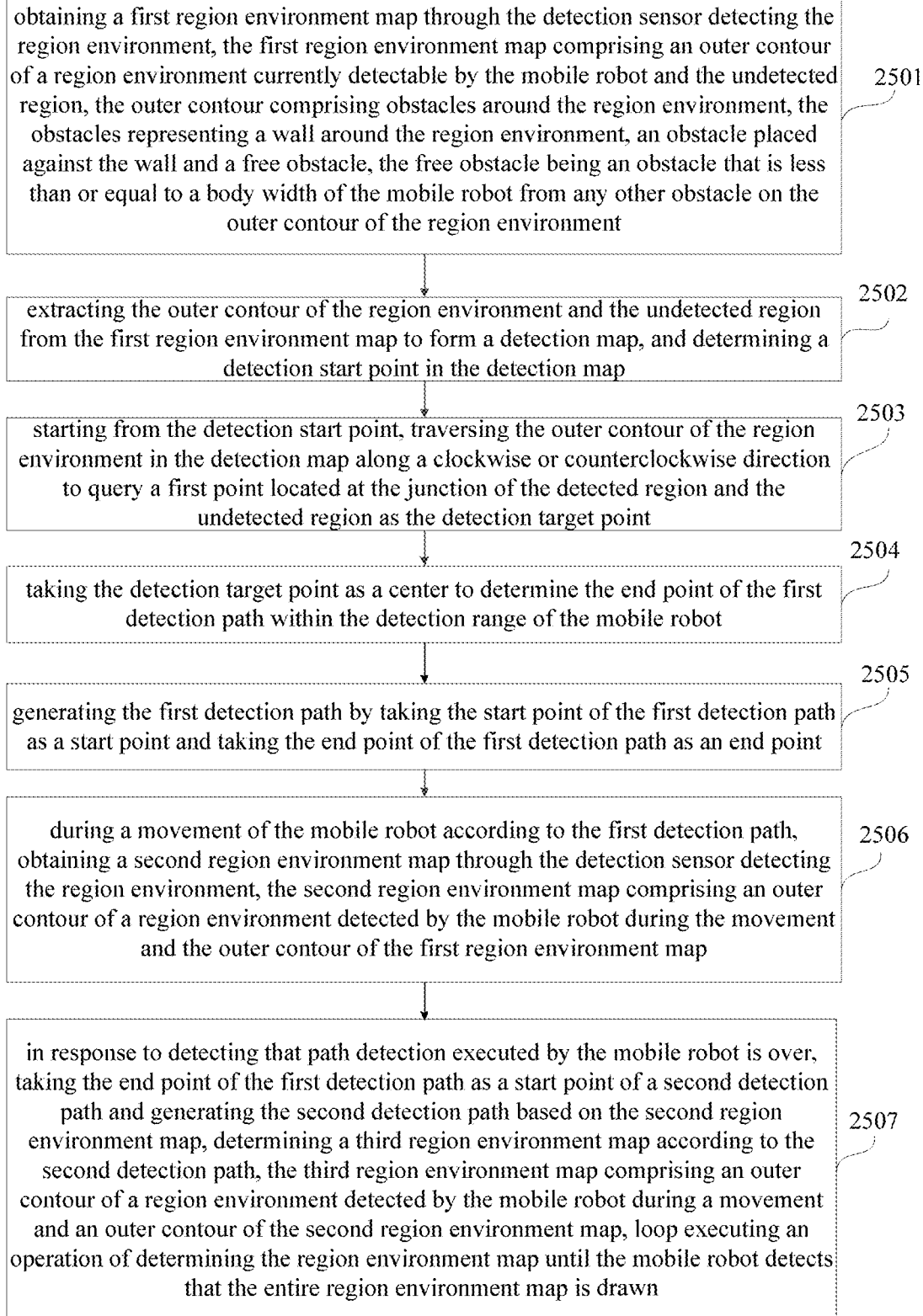
FIG. 25 is a flow diagram of a detection method according to another exemplary embodiment.

Please refer to FIG. 25, FIG. 25 is a detection method according to an exemplary embodiment. The detection method can be applied to the above mobile robot, the method includes the following implementation process:

Step 2501, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

Its specific implementation can refer to the step S1 of the embodiment shown in FIG. 6, or refer to the step 1201 of the embodiment shown in FIG. 12.

Step 2502, extracting the outer contour of the region environment and the undetected region from the first region environment map to form a detection map, and determining a detection start point in the detection map.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map. The mobile robot determines the detection start point in the detection map. As an example, the mobile robot can determine a fixed position in the outer contour of the region environment in the detection map as the detection start point (as shown in FIG. 18). The fixed position can be set according to the actual requirement.

As an example, the mobile robot starts from a position of the base station and searches along the clockwise or counterclockwise direction. The first point detected on the outer contour of the region environment is the detection start point. That is to say, the point closest to the base station can be obtained as the detection start point. For example, when the mobile robot gradually detects the region environment along the counterclockwise direction, it can determine the first point detected on the outer contour of the region environment along the counterclockwise direction as the detection start point.

It is worth mentioning that the detection map includes grids representing the outer contour of the region environment and grids of the undetected region, which can avoid the interference of middle obstacles and improve the efficiency of determining the detection path.

Step 2503, starting from the detection start point, traversing the outer contour of the region environment in the detection map along a clockwise or counterclockwise direction to query a first point located at the junction of the detected region and the undetected region as the detection target point.

In the implementation, the mobile robot executes the detection along a fixed direction. The fixed direction can be the clockwise direction or the counterclockwise direction, which is not limited in embodiments of the present application.

That is to say, based on the first region environment map, the mobile robot traverses target grids representing obstacles at the edge along a fixed hour-hand direction from the detection start point, where obstacles at the edge can refer to obstacles such as a wall or obstacles placed close to the wall, etc. As an example, a warning region where the target grid is located can be set in the merged layer. The warning region is used to indicate the region where the mobile robot needn't to repeatedly detect. As an example, a traversal trajectory information of a trajectory of traversing the target grids is obtained when the outer contour of the first region environment is detected. The grids where the traversal trajectory indicated by the traversal trajectory information is located is determined as the warning region.

Figure 26:
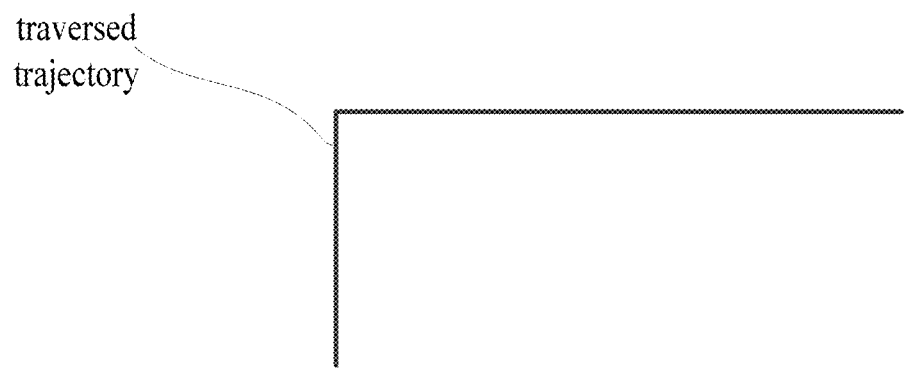
FIG. 26 is a schematic diagram of a traversal trajectory according to an exemplary embodiment.

Due to the limitation of the detection conditions of the mobile robot itself, detection results of a same position may be different during two detections of the mobile robot. For example, when drawing a region environment map for the ith time, the mobile robot marks a certain grid as a detected region. However, when drawing the region environment map for the (i+1)th time, the mobile robot marks the grid as an undetected region. For such, in order to be able to detect the grid again, when the mobile robot updates the region environment map for the (i+1)th time according to new detection data, it may be possible to adjust a part of an obstacle region of the original detected region to be an undetected region. However, due to this undetected region generated after the adjustment of the region environment map is located in the region that the mobile robot has previously detected, the mobile robot needn't to detect it again. However, the trajectory of traversing the target grid during detecting the outer contour of the first region environment can represent the outer contour of the detected region environment. Therefore, in order to avoid this situation, when detecting the outer contour of the first region environment, the mobile robot obtains the traversal trajectory information of the trajectory of traversing the target grid and determines the grids on the traversal trajectory indicated by the traversal trajectory information as the warning region, as shown in FIG. 26. In this way, the undetected regions generated after the adjustment of the region environment map can be shielded by the traversal trajectory, thereby preventing the mobile robot from moving back to repeatedly detect the detected region, thereby reducing the time-consuming for mapping.

Figure 27:
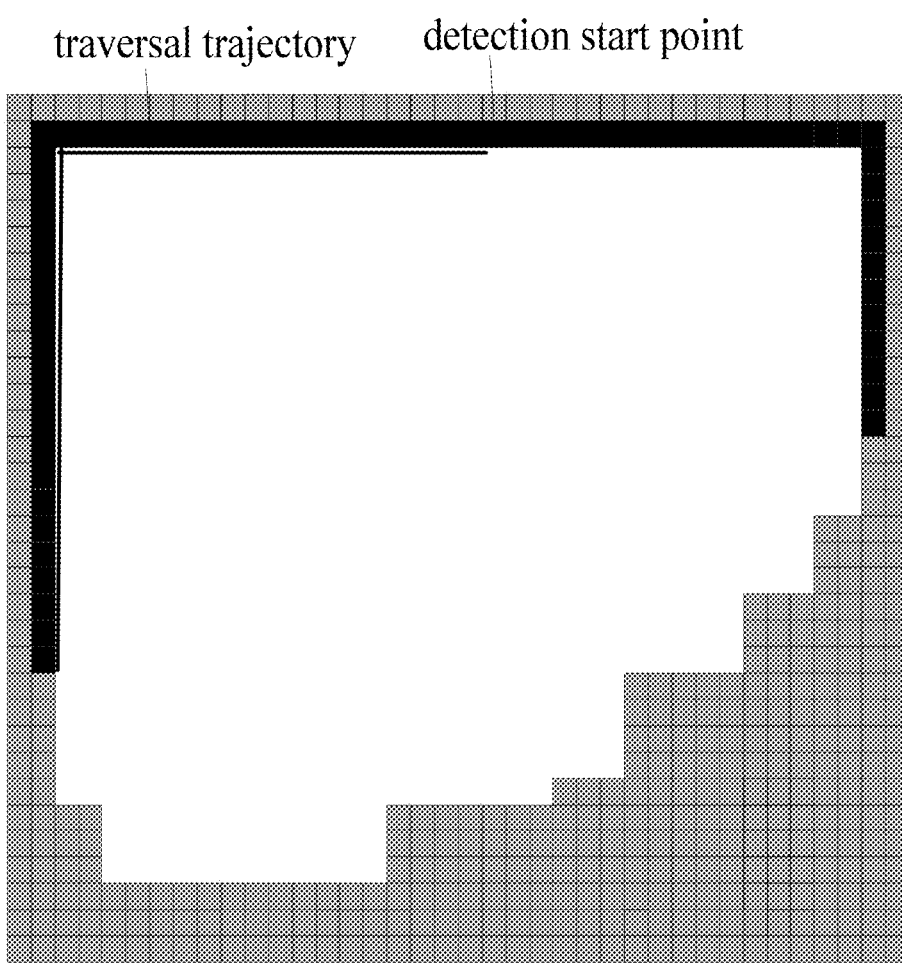
FIG. 27 is a schematic diagram of a region environment map according to another exemplary embodiment.

In this way, after the warning region is set in the merged map, a detection map is obtained as shown in FIG. 27. In the detection map, the warning region determined according to the traversal trajectory is redetermined as obstacles at the edge. The mobile robot traverses the determined target grid along the reference hour-hand direction from the detection start point in the detection map. When the first grid located at the junction of the detected region and the undetected region is found, it is determined as the detection target point. At this time, the surrounding of the detection target point includes the detected region and the undetected region. It is not difficult to be understood that the detection target point is what the mobile robot needs to detect.

As an example, each time the mobile robot traverses the outer contour of the region environment in the detection map, it can record the traversal path. The start point of the traversal path is the detection start point, and the end point of the traversal path is the detection target point. The trajectory of the traversal path is along the edge of the outer contour of the region environment, such as that shown in FIG. 27. In this way, every time a detection map is generated, the mobile robot can use the traversal trajectory information used in the previous cycle, and takes the grids on the traversal trajectory indicated by the traversal trajectory information as a warning region and adds the warning region to the detection map, thereby serving it as a new obstacle. In the detection map, due to the traversal trajectory continuously extends along the reference hour-hand direction, the detection target point is also advanced along the reference hour-hand direction. Therefore, the subsequent detection path established by adopting such detection target points can ensure that the mobile robot is configured to move along the outer contour of the region environment in the region environment according to the reference hour-hand direction to gradually detect the region environment. In addition, it can also ensure that the mobile robot will not repeatedly detect the detected region.

It should be noted that the grids at the junction can represent points in the passable region or represent points in the detection region, which is not limited in the present application.

It should be noted that the above steps 2502 and 2503 are applied to implement step S2: determining a detection target point based on the first region environment map.

Step 2504, taking the detection target point as a center to determine the end point of the first detection path within the detection range of the mobile robot.

As an example, due to the detection target point is what the mobile robot needs to detect, the end point of the first detection path is required to be determined according to the detection target point. As an example, the mobile robot takes the detection target point as the center to determine the end point of the first detection path within the detection range of the detection sensor, that is, it should ensure that the distance between the end point of the first detection path and the detection target point does not exceed the detection range of the detection sensor.

Step 2505, generating the first detection path by taking the start point of the first detection path as a start point and taking the end point of the first detection path as an end point.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In the implementation, the current position of the mobile robot when detecting the first region environment map is mapped to the region environment map, a mapped point is determined as the start point of the first detection path, after that, a path between the start point of the first detection path and the end point of the first detection path is generated to obtain the first detection path of the current time. As an example, a shortest path between the start point of the first detection path and the end point of the first detection path can be generated. The shortest path is determined as the detection path.

Step 2506, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

The detection data includes the outer contour of the region environment of the second detection, outer contour of region environment is the outer contour of the region environment. The outer contour of the region environment is connected with the outer contour of the region environment obtained in the first detection.

After the mobile robot determines the first detection path, it can move along the first detection path. During the movement, the mobile robot can detect the region environment with the detection sensor. As above-mentioned, the mobile robot mainly adopts the equipped laser radar to detect the region environment. Further, due to some obstacles cannot be detected by the laser radar, such as a glass, a marble, or obstacles located under the detection plane of the laser radar. In some cases, these obstacles that cannot be detected by the laser radar may be located in the first detection path. Therefore, when the mobile robot moves along the first detection path, it may collide with an obstacle. When the mobile robot collides with an obstacle in the detection path, other non-laser radar detection sensors can be used to detect these obstacles to get these obstacles' information. That is, the detection data includes data detected by the laser radar and data detected by the non-laser radar sensor.

As an example, the mobile robot adopts the detection data to update the first region environment map, such that a second region environment map after the update includes the outer contour of the region environment of this detection. That is, after the mobile robot obtains the detection data, these detection data is used to update the first region environment map, such that the obtained second region environment map includes the outer contour of the region environment of this detection and the outer contour of the region environment in the first region environment map. In some embodiment, The specific implementation of updating the region environment map can include: when information of a position in the detection data is different from the information of the same position in the first region environment map, and an accuracy of the information in the detection data is greater than that of the information in the first region environment map, the information of the position in the detection data is used to replace the original information of the position in the first region environment map. When the first region environment map does not include the information of the detection data, the detection data is used to draw the outer contour of the region environment of the first region environment map to obtain the second region environment map.

Step 2507, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing an operation of determining the region environment map until the mobile robot detects that the entire region environment map is drawn.

As an example, the method that the mobile robot detects that the path detection is over can include: when detecting that there exists an obstacle in the first detection path, the mobile robot determines that the path detection is over.

That is to say, during the movement of the mobile robot along the first detection path, once the mobile robot detects that there exists an obstacle in the first detection path, it determines that the path detection is over.

Further, when the mobile robot detects that there exists an obstacle in the first detection path, the mobile robot moves around the obstacle. If the obstacle is not be circumvented after the mobile robot moves around the obstacle for a certain distance, the detection path is determined to be over. That is to say, when the mobile robot detects that there exists an obstacle in the first detection path, it can move along an edge of the obstacle. If the obstacle cannot be circumvented after the mobile robot moves around the obstacle for a certain distance, it means that the first detection path is behind the obstacle. The mobile robot cannot reach the end point of the first detection path, at this time, it cannot detect the detection target point and the surrounding thereof and needs to redetermine the detection target point. This detection is over.

Further, when the mobile robot detects that there exists an obstacle in the first detection path and moves around the obstacle, if the surrounding of the detection target point are detected regions, the mobile robot determines that the path detection is over. That is to say, when detecting that there exists an obstacle in the first detection path, the mobile robot can move around the obstacle. During the movement, the mobile robot continues to detect. When surrounding of the detection target point are detected regions, the mobile robot does not need to reach the end point of the first detection path at this time, and this detection is over.

As an example, the method that the mobile robot detects the entire region environment map is drawn can include: no detection target point is found by the mobile robot.

When the mobile robot cannot find a target detection point in the nth region environment map, that is, the surrounding of the grid of the contour of the region environment are detected regions, and the grids at the junction of the undetected region and the detected region cannot be found, the mobile robot determines that the detection of the entire region environment is over, at this time, it can determine that the outer contour of the region environment is an enclosed obstacle region.

The mobile robot is configured to move along the outer contour while keeping a certain distance from the outer contour and/or moves along an edge of the outer contour according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 10

Please refer to FIG. 28, FIG. 28 is a detection method according to an exemplary embodiment. The detection method can be applied to the above mobile robot, the method includes:

Step 2801, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment in FIG. 6, or refer to the step 1201 of the embodiment in FIG. 12.

Step 2802, extracting the outer contour of the region environment and the undetected region from the first region environment map to form a detection map, and determining a detection start point in the detection map.

In the implementation, the mobile robot can extract grids of the outer contour of the region environment from the first region environment map (as shown in FIG. 14), and extract grids of the undetected region (as shown in FIG. 15), and then merge the extracted grids to obtain a merged layer (as shown in FIG. 16). The middle obstacles are removed from the merged layer. The mobile robot can determine the merged layer as the detection map. The mobile robot determines the detection start point in the detection map. As an example, the mobile robot can determine a fixed position in the outer contour of the region environment in the detection map as the detection start point (as shown in FIG. 18). The fixed position can be set according to the actual requirement.

As an example, the mobile robot starts from a position of the base station and searches along the clockwise or counterclockwise direction. The first point detected on the outer contour of the region environment is the detection start point. That is to say, the point closest to the base station can be obtained as the detection start point. For example, when the mobile robot gradually detects the region environment along the counterclockwise direction, it can determine the first point detected on the outer contour of the region environment along the counterclockwise direction as the detection start point.

It is worth mentioning that the detection map includes grids representing the outer contour of the region environment and grids of the undetected region, which can avoid the interference of middle obstacles and improve the efficiency of determining the detection path.

Step 2803, starting from the detection start point, traversing the outer contour of the region environment in the detection map along a clockwise or counterclockwise direction to query a first point located at the junction of the detected region and the undetected region as the detection target point.

In the implementation, the mobile robot executes the detection along a fixed direction. The fixed direction can be the clockwise direction or the counterclockwise direction, which is not limited in embodiments of the present application.

That is to say, based on the first region environment map, the mobile robot traverses target grids representing obstacles at the edge along a fixed hour-hand direction from the detection start point, where obstacles at the edge can refer to obstacles such as a wall or obstacles placed close to the wall, etc. As an example, a warning region where the target grid is located can be set in the merged layer. The warning region is used to indicate a region where the mobile robot needn't to repeatedly detect. As an example, a traversal trajectory information of a trajectory of traversing the target grids is obtained when the outer contour of the first region environment is detected. The grids on the traversal trajectory indicated by the traversal trajectory information are determined as the warning region.

Due to the limitation of the detection conditions of the mobile robot itself, detection results of a same position may be different during two detections of the mobile robot. For example, when drawing a region environment map for the ith time, the mobile robot marks a certain grid as a detected region. However, when drawing the region environment map for the (i+1)th time, the mobile robot marks the grid as an undetected region. In this way, in order to be able to detect the grid again, when the mobile robot updates the region environment map for the (i+1)th time according to new detection data, it may be possible to adjust a part of an obstacle region of the original detected region to be an undetected region. However, due to this undetected region generated after the adjustment of the region environment map is located in the region that the mobile robot has previously detected, the mobile robot needn't to detect it again. However, the trajectory of traversing the target grid during detecting the outer contour of the first region environment can represent the outer contour of the detected region environment. Therefore, in order to avoid this situation, when detecting the outer contour of the first region environment, the mobile robot obtains the traversal trajectory information of the trajectory of traversing the target grid and determines the grids on the traversal trajectory indicated by the traversal trajectory information as the warning region, as shown in FIG. 26. In this way, the undetected regions generated after the adjustment of the region environment map can be shielded by the traversal trajectory, thereby preventing the mobile robot from moving back to repeatedly detect the detected region, thereby reducing the time-consuming for mapping.

In this way, after the warning region is set in the merged map, a detection map is obtained as shown in FIG. 27. In the detection map, the warning region determined according to the traversal trajectory is redetermined as obstacles at the edge. The mobile robot traverses the determined target grid along the reference hour-hand direction from the detection start point in the detection map. When the first grid located at the junction of the detected region and the undetected region is found, it is determined as the detection target point. At this time, the surrounding of the detection target point includes the detected region and the undetected region. It is not difficult to be understood that the detection target point is what the mobile robot needs to detect.

It should be noted that each time the mobile robot traverses the outer contour of the region environment in the detection map, it can record the traversal path. The start point of the traversal path is the detection start point, and the end point of the traversal path is the detection target point. The trajectory of the traversal path is along the edge of the outer contour of the region environment, for example, as shown in FIG. 27. In this way, every time a detection map is generated, the mobile robot can use the traversal trajectory information used in the previous cycle, and takes the grids where the traversal trajectory indicated by the traversal trajectory information is located as a warning region and adds the warning region to the detection map, thereby serving as a new obstacle to use. In the detection map, due to the traversal trajectory continuously extends along the reference hour-hand direction, the detection target point is also advanced along the reference hour-hand direction. Therefore, the subsequent detection path established by adopting such detection target points can ensure that the mobile robot is configured to move along the outer contour of the region environment in the region environment according to the reference hour-hand direction to gradually detect the region environment. In addition, it can also ensure that the mobile robot will not repeatedly detect the detected region.

It should be noted that the grids at the junction can represent points in the passable region or represent points in the detection region, which is not limited in the present application.

It should be noted that the above step S 2802 and 2803 are applied to implement step S2: determining a detection target point based on the first region environment map.

Step 2804, taking the detection target point as a center to determine the end point of the first detection path within the detection range of the mobile robot.

As an example, due to the detection target point is what the mobile robot needs to detect, the end point of the first detection path is required to be determined according to the detection target point. As an example, the mobile robot takes the detection target point as the center to determine the end point of the first detection path within the detection range of the detection sensor, that is, it should ensure that the distance between the end point of the first detection path and the detection target point does not exceed the detection range of the detection sensor.

Step 2805, generating the first detection path by taking the start point of the first detection path as a start point and taking the end point of the first detection path as an end point.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In the implementation, the current position of the mobile robot when detecting the first region environment map is mapped to the region environment map, a mapped point is determined as the start point of the first detection path, after that, a path between the start point of the first detection path and the end point of the first detection path is generated to obtain the first detection path of the current time. As an example, a shortest path between the start point of the first detection path and the end point of the first detection path can be generated. The shortest path is determined as the first detection path.

Step 2806, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

The specific implementation can refer to the step 2506 of the embodiment shown in FIG. 25.

Step 2807, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and the outer contour of the second region environment map, loop executing an operation of determining the region environment map until the mobile robot detects that the entire region environment map is drawn.

The specific implementation can refer to the step 2507 of the embodiment shown in FIG. 25.

The mobile robot is configured to move along the outer contour while keeping a certain distance from the outer contour and/or moves along an edge of the outer contour according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

In some embodiment, the base station may also be parked in a middle of the room, and there exists a large obstacle similar to the wall of the room close to the base station, as shown in FIG. 29. In this case, After the mobile robot detects around the obstacle according to the above method, the closed loop is formed as shown in FIG. 29. The mobile robot judges whether itself is in the closed loop. If the mobile robot is not in the closed loop, it means that what detected is not the outer contour of the region environment. In this case, the mobile robot takes the base station as an origin and takes a certain threshold as a radius to redetermine a detection start point near the obstacles at the edge of the room, and redetects the region environment from the detection start point. The threshold can be set according to actual requirement.

Embodiment 11

The above description takes an example of generating a detection map based on the first region environment map and traversing in the detection map to determine the detection target point for description. In another embodiment, it is also possible to traverse directly in the first region environment map to determine the detection target point. Please refer to FIG. 30, FIG. 30 is a flow diagram of a detection method according to another Exemplary embodiment. The detection method can be applied to a mobile robot, the method can include:

Step 3001, obtaining a first region environment map with the detection sensor detecting a region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to above step S1 of the embodiment in FIG. 6.

Step 3002, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiment, the first region environment map is a grid map. The first region environment map includes a detected region and an undetected region. The detected region is a region that has been detected by the detection sensor. The undetected region is a region that has not been detected by the detection sensor. The detected region includes a passable region, which represents a region where the mobile robot can pass.

As an example, the detected region in the first region environment map is specifically a region detected by a mobile robot through the laser radar and/or the non-laser radar detection sensor. The detected region includes the outer contour of the first region environment and the passable region. Further, the detected region can also include the mobile robot, the base station, and middle obstacles, that is, in drawing the first region environment map, the mobile robot can identify a position of the base station. As mentioned above, before executing a detection, the robot is parked in the base station, thus the position of the base station can be determined according to a distance and angle that the mobile robot has moved, thereby marking the position of the base station on the first region environment map. In addition, the undetected region is a region that has been not detected by the mobile robot. The mobile robot cannot determine whether the undetected region is the passable region or a region locating an obstacle. Due to a detection range of the laser signal of the laser radar is limited, the laser radar cannot detect the region environment outside the detection range, and when the laser signal of the laser radar is blocked by the obstacle, the laser radar cannot detect a region behind the obstacle. These regions which the laser radar cannot detect are the undetected regions.

As an example, a warning region where the target grid is located can be set in the first region environment map. The warning region is used to indicate a region where the mobile robot needn't to repeatedly detect. As an example, a traversal trajectory information of a trajectory of traversing target grids is obtained when the outer contour of the first region environment is detected. The grids on the traversal trajectory indicated by the traversal trajectory information is determined as the warning region.

Due to the limitation of the detection conditions of the mobile robot itself, detection results of a same position may be different during two detections of the mobile robot. For example, when drawing a region environment map for the ith time, the mobile robot marks a certain grid as a detected region. However, when drawing the region environment map for the (i+1)th time, the mobile robot marks it as an undetected region. In this way, in order to be able to detect the certain grid again, when the mobile robot updates the region environment map for the (i+1)th time according to new detection data, it may be possible to adjust a part of the obstacle region of the original detected region to be an undetected region. However, due to this undetected region generated after the adjustment of the region environment map is located in the region that the mobile robot has previously detected, the mobile robot needn't to detect it again. However, the trajectory of traversing the target grid during detecting the outer contour of the first region environment can represent the outer contour of the detected region environment. Therefore, in order to avoid this situation, when detecting the outer contour of the first region environment, the mobile robot obtains the traversal trajectory information of the trajectory of traversing the target grid and determines the grids on the traversal trajectory indicated by the traversal trajectory information as the warning region, as shown in FIG. 26. In this way, the undetected regions generated after the adjustment of the region environment map can be shielded by the traversal trajectory, thereby preventing the mobile robot from moving back to repeatedly detect the detected region, thereby reducing the time-consuming for mapping.

Figure 31:
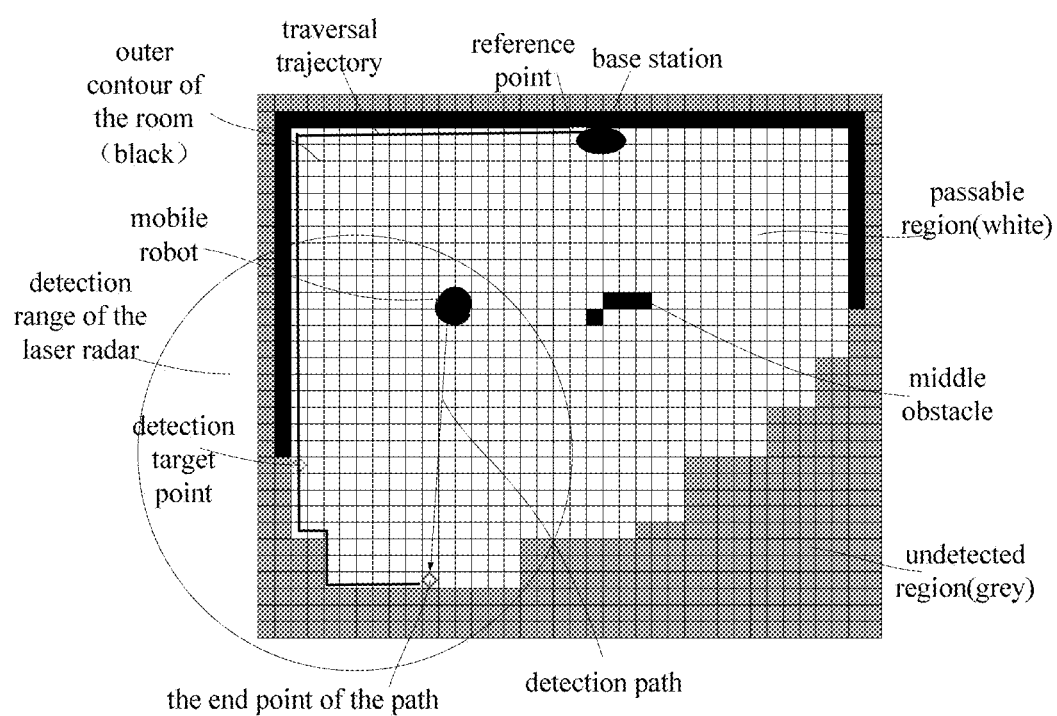
FIG. 31 is a schematic diagram of a region environment map according to an exemplary embodiment.

After that, in the first region environment map provided with the warning region, the mobile robot traverses the target grids according to the reference hour-hand direction from the detection start point. Please refer to FIG. 31, the target grid can represent the grid where the outer contour of the region environment is located. The detection start point can be the grid point that has a reference distance to the base station. The reference distance can be preset according to the actual requirement. For example, the reference point can be a first grid point found on the outer contour of the region environment along the reference hour-hand direction starting from the base station. In addition, the reference hour-hand direction can be the clockwise direction or the counterclockwise direction, which is not limited in the embodiments of the present application. That is to say, the mobile robot traverses the target grids representing obstacles at the edge along a certain fixed hour-hand direction from the detection start point based on the first region environment map to determine the detection target point. The obstacles at the edge can refer to the wall, obstacles placed close to the wall, etc.

As an example, the mobile robot takes the detection target point as the center to determine the end point of the detection path within the detection range of the detection sensor, that is, it should ensure that the distance between the end point of the detection path and the detection target point does not exceed the detection range of the detection sensor.

As an example, the current position of the mobile robot when detecting the first region environment map is mapped to the region environment map, a mapped point is determined as the start point of the first detection path, after that, a path between the start point of the first detection path and the end point of the first detection path is generated to obtain the first detection path of this time. As an example, a shortest path between the start point of the first detection path and the end point of the first detection path can be generated. The shortest path is determined as the first detection path.

Step 3003, during a movement of the mobile robot according to the first detection path, obtaining a second region environment map with the detection sensor detecting the region environment, the second region environment map comprising an outer contour of a region environment detected by the mobile robot during the movement and the outer contour of the first region environment map.

The specific implementation can refer to the step 2506 of the embodiment shown in FIG. 25.

Step 3004, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing the operation of determining the region environment map until the mobile robot detects that the entire region environment map is drawn.

The specific implementation can refer to the step 2507 of the embodiment shown in FIG. 25.

The mobile robot is configured to move along the outer contour while keeping a certain distance from the outer contour and/or moves along an edge of the outer contour when moving according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 12

Figure 32:
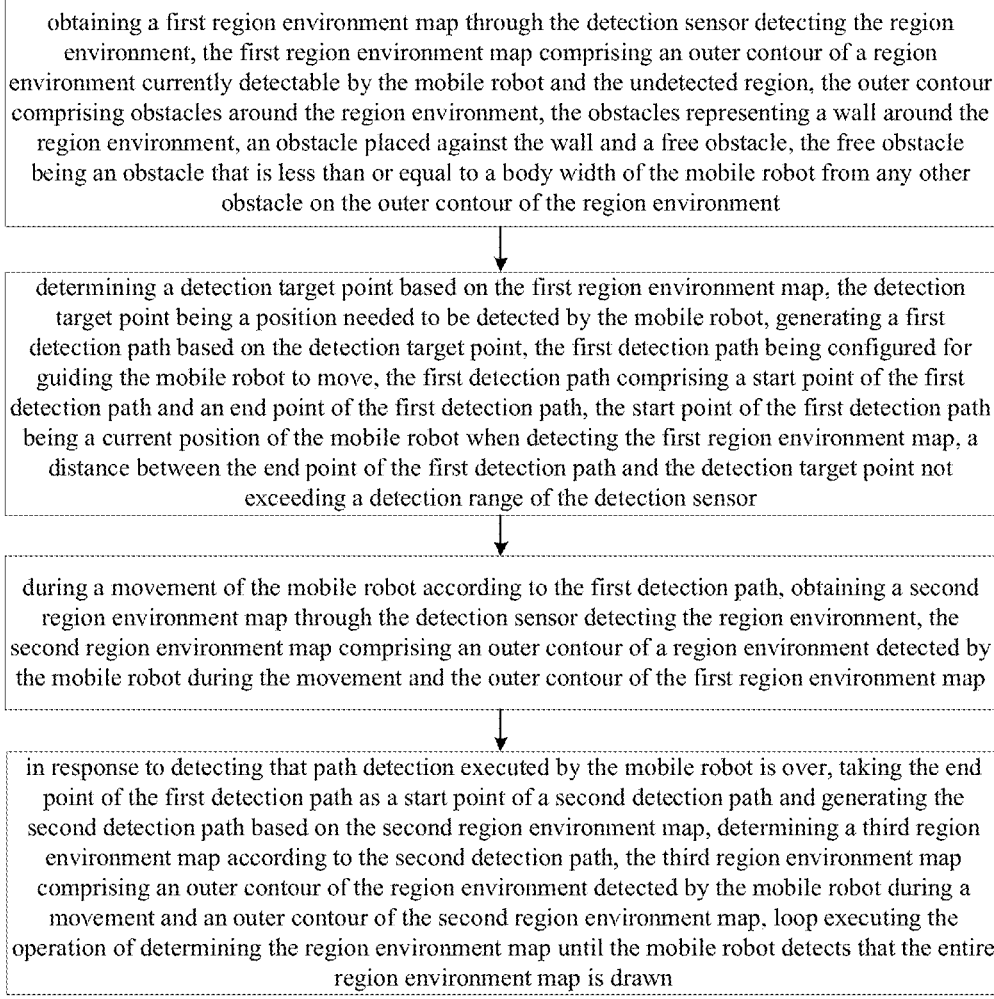
FIG. 32 is a flow diagram of a detection method according to another exemplary embodiment.

FIG. 32 is a detection method according to an exemplary embodiment. The detection method can be applied to the above mobile robot, the method includes:

Step 3201, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6.

Step 3202, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor.

Due to a detection range of the mobile robot detecting a region environment for one time is limited, the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiment, the first region environment map is a grid map. The first region environment map includes a detected region and an undetected region. The detected region is a region that has been detected by the detection sensor. The undetected region is a region that has not been detected by the detection sensor. The detected region includes a passable region, which represents a region where the mobile robot can pass.

As an example, the detected region in the first region environment map is specifically a region detected by a mobile robot through the laser radar and/or the non-laser radar detection sensor. The detected region includes the outer contour of the first region environment and the passable region. Further, the detected region may also include the mobile robots, the base station, and middle obstacles, that is, in drawing the first region environment map, the mobile robot can identify a position of the base station. As above-mentioned, before executing a detection, the robot is parked in the base station, thus the position of the base station can be determined according to a distance and angle that the mobile robot has moved, thereby marking the position of the base station on the first region environment map. In addition, the undetected region is a region that has been not detected by the mobile robot. The mobile robot cannot determine whether the undetected region is the passable region or a region locating an obstacle. Due to a detection range of the laser signal of the laser radar is limited, the laser radar cannot detect the region environment outside the detection range, and when the laser signal of the laser radar is blocked by an obstacle, the laser radar cannot detect a region behind the obstacle. These regions which the laser radar cannot detect are the undetected regions.

As an example, the warning region where the target grid is located can be set in the first region environment map. The warning region is used to indicate a region that the mobile robot does not need to repeatedly detect. As an example, the warning region can include the following two aspects. In one aspect, as an example, when a distance between a free obstacle and an obstacle at the outer contour of the region environment is less than a distance threshold, a region between the two obstacles is set as a warning region. The outer contour of the region environment also includes the warning region. In another aspect, the traversal trajectory information of a trajectory of traversing target grids is obtained when the outer contour of the first region environment is detected. The grids on the traversal trajectory indicated by the traversal trajectory information are determined as warning regions.

For the first aspect, the warning region refers to a region that needn't to be detected. When a distance between a free obstacle and an obstacle at the outer contour of the region environment is less than the distance threshold, the mobile robot cannot work in the region, thus the region can be set as a warning region. The warning region together with the free obstacle and the obstacle at the outer contour of the region environment are integrated as the outer contour of the region environment.

The distance threshold can be set by users according to the actual requirement, or be set by the mobile robot by default, which is not limited in the embodiment of the present application. For example, the distance threshold can be set to be 1.5 times of a width of the mobile robot.

For the second aspect, due to the limitation of the detection conditions of the mobile robot itself, detection results of a same position may be different during two detections of the mobile robot. For example, when drawing a region environment map for the ith time, the mobile robot marks a certain grid as a detected region. However, when drawing the region environment map for the (i+1)th time, the mobile robot marks the grip as an undetected region. In this way, in order to be able to detect the grid again, when the mobile robot updates the region environment map for the (i+1)th time according to new detection data, it may be possible to adjust a part of the obstacle region of the original detected region to be an undetected region. However, due to this undetected region generated after the adjustment of the region environment map is located in the region that the mobile robot has previously detected, the mobile robot needn't to detect it again. However, the trajectory of traversing the target grid during detecting the outer contour of the first region environment can represent the outer contour of the detected region environment. Therefore, in order to avoid this situation, when detecting the outer contour of the first region environment, the mobile robot obtains the traversal trajectory information of the trajectory of traversing the target grid and determines the grids on the traversal trajectory indicated by the traversal trajectory information as the warning region, as shown in FIG. 26. In this way, the undetected regions generated after the adjustment of the region environment map can be shielded by the traversal trajectory, thereby preventing the mobile robot from moving back to repeatedly detect the detected region, thereby reducing the time-consuming for mapping.

After that, in the first region environment map provided with the warning region, the mobile robot traverses the target grids according to the reference hour-hand direction from the detection start point. Please refer to FIG. 31, the target grid can be the grid on the outer contour of the region environment. The detection start point can be the grid point that has a reference distance to the base station. The reference distance can be preset according to the actual requirement. For example, the reference point can be a first grid point found on the outer contour of the region environment along the reference hour-hand direction starting from the base station. In addition, the reference hour-hand direction can be the clockwise direction or the counterclockwise direction, which is not limited in the embodiments of the present application. That is to say, the mobile robot traverses the target grids representing obstacles at the edge along a certain fixed hour-hand direction from the detection start point based on the first region environment map to determine the detection target point. The obstacles at the edge can refer to the wall, obstacles placed close to the wall, etc.

As an example, the mobile robot takes the detection target point as a center to determine the end point of the detection path within the detection range of the detection sensor, that is, it's only needed to ensure that the distance between the end point of the detection path and the detection target point does not exceed the detection range of the detection sensor.

As an example, the current position of the mobile robot when detecting the first region environment map is mapped to the region environment map, a mapped point is determined as the start point of the first detection path, after that, a path between the start point of the first detection path and the end point of the first detection path is generated to obtain the first detection path of the current time. As an example, a shortest path between the start point of the first detection path and the end point of the first detection path can be generated and determined as the first detection path.

Step 3203, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

The specific implementation can refer to the step 2506 of the embodiment shown in FIG. 25.

Step 3204, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of the region environment detected by the mobile robot during a movement according to the second detection path and an outer contour of the second region environment map, loop executing the operation of determining the region environment map until the mobile robot detects that the entire region environment map is drawn.

The specific implementation can refer to the step 2507 of the embodiment shown in FIG. 25.

The mobile robot is configured to move along the outer contour while keeping a certain distance from the outer contour and/or moves along an edge of the outer contour when moving according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the each outer contour, and then moves along the edge of the outer contour.

Embodiment 13

Figure 33:
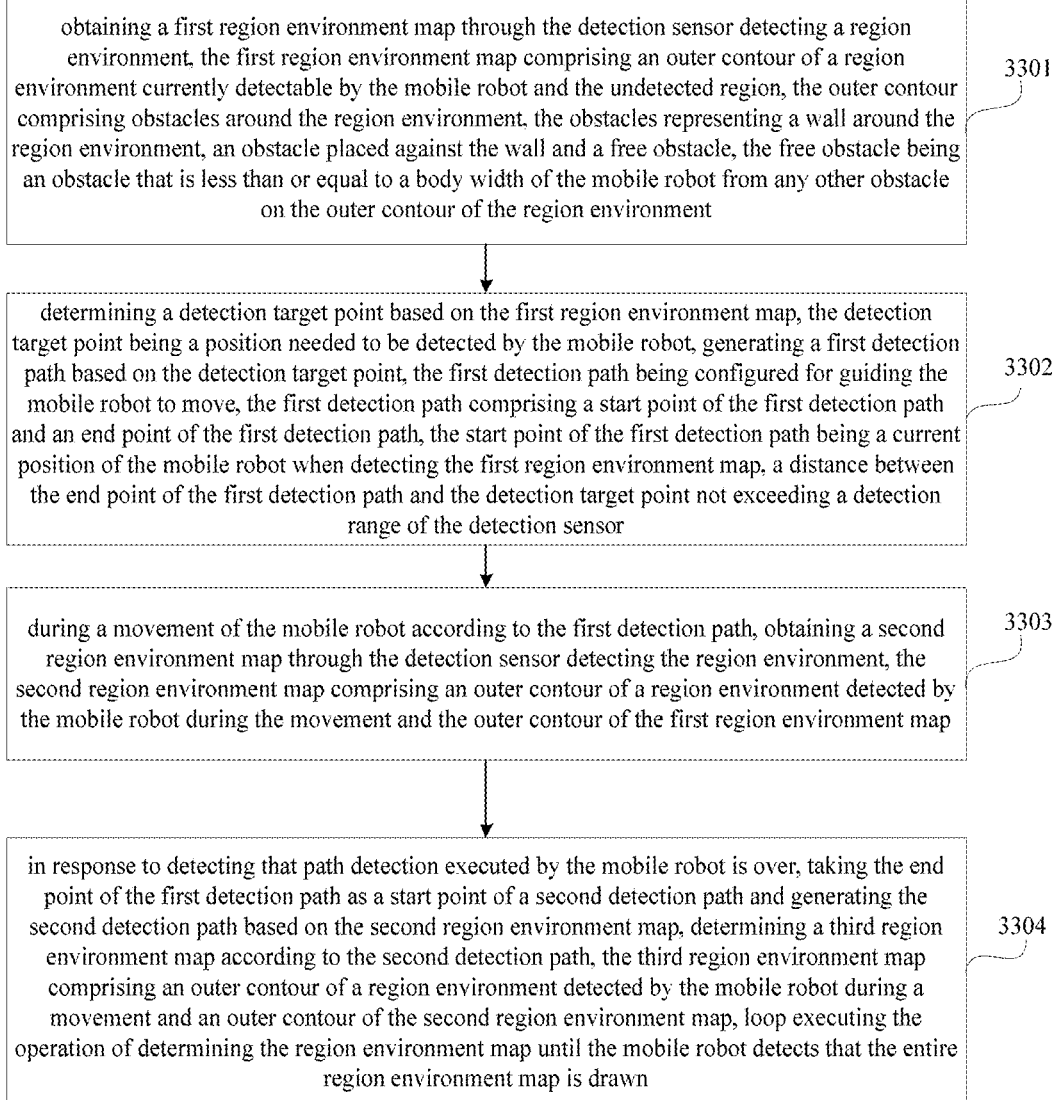
FIG. 33 is a flow diagram of a detection method according to another exemplary embodiment.

Please refer to FIG. 33, FIG. 33 is a detection method according to an exemplary embodiment. The detection method can be applied to the above mobile robot, the method includes:

Step 3301, obtaining a first region environment map through the detection sensor detecting a region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment shown in FIG. 6.

Step 3302, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiment, the first region environment map is a grid map. The first region environment map includes a detected region and an undetected region. The detected region is a region that has been detected by the detection sensor. The undetected region is a region that has not been detected by the detection sensor. The detected region includes a passable region, which represents a region where the mobile robot can pass.

As an example, the detected region in the first region environment map is specifically a region detected by a mobile robot through the laser radar and/or the non-laser radar detection sensor. The detected region includes the outer contour of the first region environment and the passable region. Further, the detected region may also include the mobile robot, the base station, and middle obstacles, that is, in drawing the first region environment map, the mobile robot can identify a position of the base station. As mentioned above, before executing a detection, the robot is parked in the base station, thus the position of the base station can be determined according to a distance and angle that the mobile robot has moved, thereby marking the position of the base station on the first region environment map. In addition, the undetected region is the region that has not been detected by the mobile robot. The mobile robot cannot determine whether the undetected region is a passable region or a region locating an obstacle. Due to a detection range of the laser signal of the laser radar is limited, the laser radar cannot detect the region environment outside the detection range, and when the laser signal of the laser radar is behind an obstacle, the laser radar cannot detect a region behind the obstacle. These regions which the laser radar cannot detect are the undetected regions.

As an example, the warning region where the target grid is located can be set in the first region environment map. The warning region is used to indicate the region where the mobile robot does not need to repeatedly detect. As an example, the warning region can include the following two aspects. In one aspect, as an example, when a distance between a free obstacle and an obstacle at the outer contour of the region environment is less than a distance threshold, a region between the two obstacles is set as a warning region. The outer contour of the region environment also includes the warning region. In another aspect, the traversal trajectory information of a trajectory of traversing target grids is obtained when the outer contour of the first region environment is detected. The grids on the traversal trajectory indicated by the traversal trajectory information are determined as warning regions.

For the first aspect, the warning region refers to a region that needn't to be detected. When a distance between a free obstacle and an obstacle at the outer contour of the region environment is less than the distance threshold, the mobile robot cannot work in the region, thus the region can be set as a warning region. The warning region together with the free obstacle and the obstacle at the outer contour of the region environment are integrated as the outer contour of the region environment.

The distance threshold can be set by users according to the actual requirement, or be set by the mobile robot by default, which is not limited in the embodiment of the present application. For example, the distance threshold can be set to be 1.5 times of a body width of the mobile robot.

For the second aspect, due to the limitation of the detection conditions of the mobile robot itself, the detection results of a same position may be different during two detections of the mobile robot. For example, when drawing a region environment map for the ith time, the mobile robot marks a certain grid as a detected region. However, when drawing a region environment map for the (i+1)th time, the mobile robot marks the grip as an undetected region. In this way, in order to be able to detect the certain grid again, when the mobile robot updates the region environment map for the (i+1)th time according to the new detection data, it may be possible to adjust a part of the obstacle region of the original detected region to be an undetected region. However, due to this undetected region generated after the adjustment of the region environment map is located in the region that the mobile robot has previously detected, the mobile robot needn't to detect it again. However, the trajectory of traversing the target grid during detecting the outer contour of the first region environment can represent the outer contour of the detected region environment. Therefore, in order to avoid this situation, when detecting the outer contour of the first region environment, the mobile robot obtains the traversal trajectory information of the trajectory of traversing the target grid and determines the grids on the traversal trajectory indicated by the traversal trajectory information as the warning region, as shown in FIG. 26. In this way, the undetected regions generated after the adjustment of the region environment map can be shielded by the traversal trajectory, thereby preventing the mobile robot from moving back to repeatedly detect the detected region, thereby reducing the time-consuming for mapping.

After that, in the first region environment map provided with the warning region, the mobile robot traverses the target grids according to the reference hour-hand direction from the detection start point. Please refer to FIG. 31, the target grid can be the grid on the outer contour of the region environment. The detection start point can be the grid point that has a reference distance to the base station. The reference distance can be preset according to the actual requirement. For example, the reference point can be a first grid point found on the outer contour of the region environment along the reference hour-hand direction starting from the base station. In addition, the reference hour-hand direction can be the clockwise direction or the counterclockwise direction, which is not limited in the embodiments of the present application. That is to say, the mobile robot traverses the target grids representing obstacles at the edge along a certain fixed hour-hand direction from the detection start point based on the first region environment map to determine the detection target point. The obstacles at the edge can refer to the wall, obstacles placed close to the wall, etc.

As an example, the mobile robot takes the detection target point as a center and takes the detection range of the mobile robot as a radius to make a circle to determine a range. Due to the detection target point is located within the range, the detection target point can be directly determined as the end point of the first detection path, that is, the end point of the first detection path and the detection target point can be the same point.

As an example, the current position of the mobile robot when detecting the first region environment map is mapped to the region environment map, a mapped point is determined as the start point of the first detection path, after that a path between the start point of the first detection path and the end point of the first detection path is generated. As an example, a difference value between a length of the first detection path and a length of the shortest path between the two points is within a reference value range.

The mobile robot can take the start point of the first detection path as the start point and take the end point of the first detection path as the end point to generate a curve between the two points to obtain the first detection path, a difference value between a length of the curve and the length of the shortest path is within the reference value range.

The reference value range can be set by users according to the actual requirement or can be set by the mobile robot by default which is not limited in the embodiments of the present application.

Step 3303, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map.

The specific implementation can refer to the step 2506 of the embodiment shown in FIG. 25.

Step 3304, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing the operation of determining the region environment map until the mobile robot detects that the entire region environment map is drawn.

The specific implementation can refer to the step 2507 of the embodiment shown in FIG. 25.

The mobile robot is configured to move along the outer contour while keeping a certain distance from the outer contour and/or moves along an edge of the outer contour when moving according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as a wall and obstacles such as a marble, a glass, and the mobile robot moves according to a certain detection path, it may first move along the outer contour while keeping a certain distance from the outer contour, and then moves along the edge of the outer contour.

Embodiment 14

Figure 34:
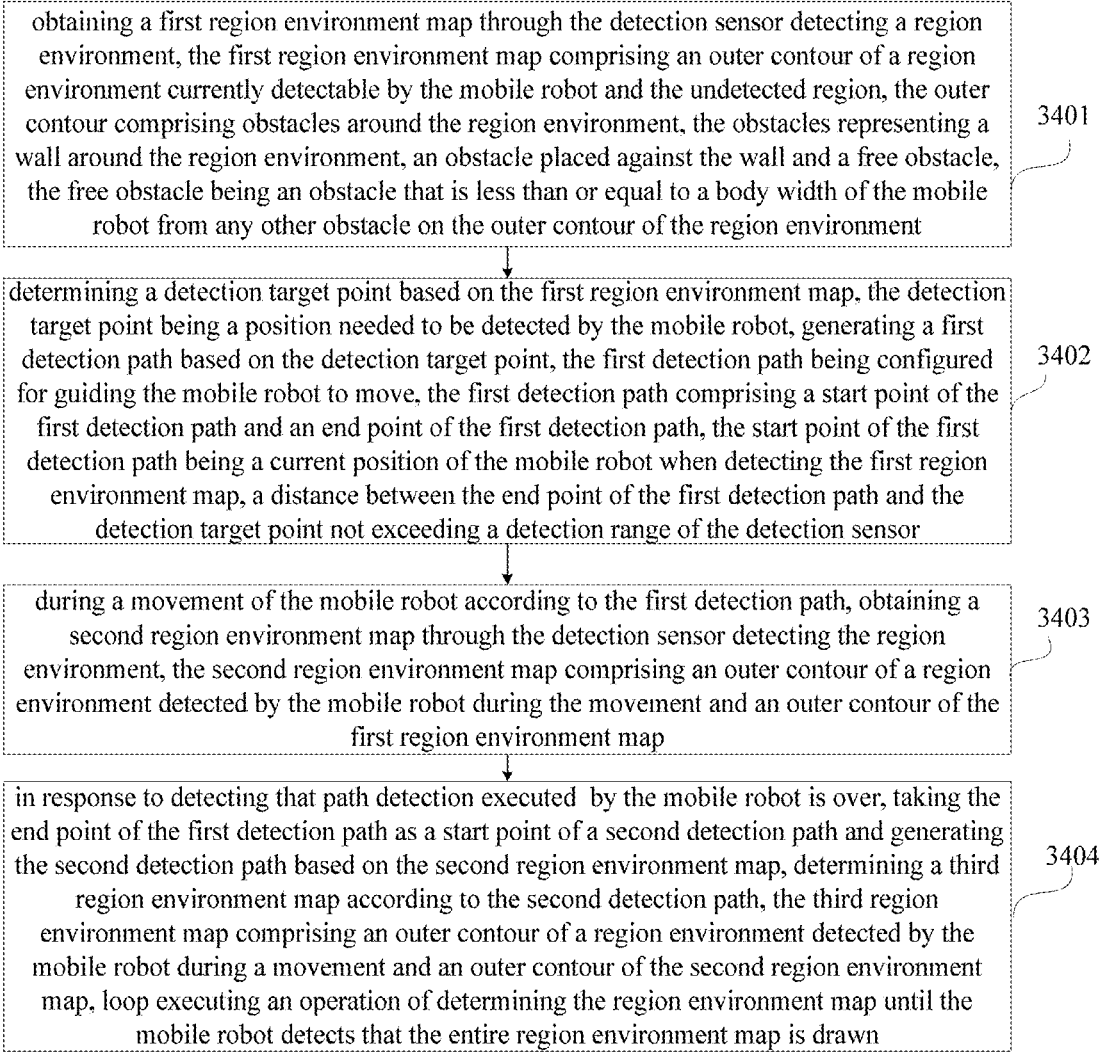
FIG. 34 is a flow diagram of a detection method according to another exemplary embodiment.

Please refer to FIG. 34, FIG. 34 is a detection method according to an exemplary embodiment. The detection method can be applied to the above mobile robot, the method includes:

Step 3401, obtaining a first region environment map through the detection sensor detecting a region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

The specific implementation can refer to the step S1 of the embodiment in FIG. 6.

Step 3402, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor.

Due to a detection range of the mobile robot detecting a region environment for one time is limited, the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiment, the first region environment map is a grid map. The first region environment map includes a detected region and an undetected region. The detected region is a region detected by the detection sensor. The undetected region is a region not detected by the detection sensor. The detected region includes a passable region which is a region where the mobile robot can pass.

As an example, the detected region in the first region environment map is specifically a region detected by a mobile robot through the laser radar and/or the non-laser radar detection sensor. The detected region includes the outer contour of the first region environment and the passable region. Further, the detected region may also include the mobile robot, the base station, and middle obstacles, that is, in drawing the first region environment map, the mobile robot can identify a position of the base station. As above-mentioned, before executing a detection, the robot is parked in the base station, thus the position of the base station can be determined according to a distance and angle that the mobile robot has moved, thereby marking the position of the base station on the first region environment map. In addition, the undetected region is the region that has been not detected by the mobile robot. The mobile robot cannot determine whether the undetected region is a passable region or a region locating an obstacle. Due to a detection range of the laser signal of the laser radar is limited, the laser radar cannot detect the region environment outside the detection range, and when the laser signal of the laser radar is blocked by the obstacle, the laser radar cannot detect a region behind the obstacle. These regions which the laser radar cannot detect are the undetected regions.

As an example, the warning region where the target grid is located can be set in the first region environment map. The warning region is used to indicate the region where the mobile robot does not need to repeatedly detect. As an example, the warning region can include the following two aspects. In one aspect, as an example, when a distance between the free obstacle and an obstacle at the outer contour of the region environment is less than a distance threshold, a region between the two obstacles is set as the warning region. The outer contour of the region environment also includes the warning region. In other aspect, the traversal trajectory information of a trajectory of traversing target grids is obtained when the outer contour of the first region environment is detected. The grids where the traversal trajectory indicated by the traversal trajectory information is located is determined as the warning region.

For the first aspect, the warning region refers to a region that needn't to be detected. When the distance between the free obstacle and an obstacle at the outer contour of the region environment is less than the distance threshold, the mobile robot cannot work in the region, thus the region can be set as the warning region. The warning region together with the free obstacle and the obstacle at the outer contour of the region environment are used as the outer contour of the region environment.

The distance threshold can be set by users according to the actual requirement, or be set by the mobile robot by default, which is not limited in the embodiment of the present application. For example, the distance threshold can be set to be 1.5 times of a body width of the mobile robot.

For the second aspect, due to the limitation of the detection conditions of the mobile robot itself, the detection results of the mobile robot at two times before and after may be different for the same position. For example, when drawing a region environment map for the ith time on a certain grid, the mobile robot marks it as a detected region. However, when drawing a region environment map for the (i+1)th time, the mobile robot marks it as an undetected region. In this way, in order to be able to detect the certain grid again, when the mobile robot updates the region environment map at the (i+1)th time according to the new detection data, it may be possible to adjust a part of the position of the obstacle region of the original detected region to the undetected region. However, due to this undetected region generated after the adjustment of the region environment map is located in the region that the mobile robot has previously detected, the mobile robot needn't to detect it again. However, the trajectory of traversing the target grid when the outer contour of the first region environment is detected can represent the outer contour of the detected region environment. Therefore, in order to avoid this situation, when detecting the outer contour of the first region environment, the mobile robot obtains the traversal trajectory information of the trajectory of traversing the target grid and determines the grids where the traversal trajectory indicated by the traversal trajectory information is located as the warning region, as shown in FIG. 26. In this way, the undetected regions generated after the adjustment of the region environment map can be shielded by the traversal trajectory, thereby preventing the mobile robot from moving back to repeatedly detect the detected region, thereby reducing the time-consuming for mapping.

After that, in the first region environment map provided with the warning region, the mobile robot traverses the target grids according to the reference hour-hand direction from the detection start point. Please refer to FIG. 31, the target grid can represent the grid where the outer contour of the region environment is located and is represented by the outer contour of the region environment. The detection start point can be the grid point that takes the base station as the start point and has a reference distance to the base station. The reference distance can be preset according to the actual requirement. For example, the reference point can be a first grid point found on the outer contour of the region environment along the reference hour-hand direction starting from the base station. In addition, the reference hour-hand direction can be clockwise direction or counterclockwise direction, which is not limited in the embodiments of the present application. That is to say, the mobile robot traverses the target grids representing obstacles at the edge along a certain fixed hour-hand direction from the detection start point based on the first region environment map to determine the detection target point. The obstacles at the edge can refer to the wall, obstacles placed close to the wall, etc.

Figure 20:
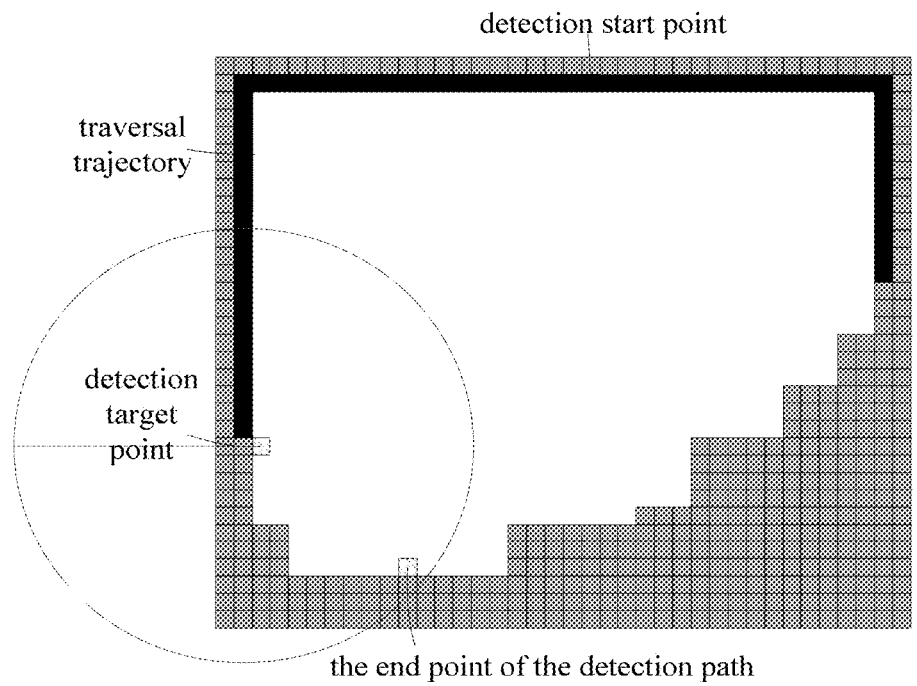
FIG. 20 is a schematic diagram of a region environment map according to an exemplary embodiment.

As an example, please refer to FIG. 20, the mobile robot can take the detection target point as the center and take the detection distance of the detection sensor as the radius to make a circle, and determines the grids at the junction of a circular region and the undetected region as the end point of the detection path, such that it can ensure that the mobile robot can detect the detection target point and the surrounding region of the detection target point.

As an example, the current position of the mobile robot when detecting the first region environment map is mapped to the region environment map, the mapped point is determined as the start point of the first detection path, after that a path between the start point of the first detection path and the end point of the first detection path is generated to obtain the first detection path of this time. As an example, the mobile robot can determine the shortest path between the start point of the first detection path and the end point of the first detection path as the first detection path.

The mobile robot can take the start point of the first detection path as the start point and take the end point of the first detection path as the end point to generate a curve between the two points to obtain the first detection path, wherein a difference value between a length of the curve and the length of the shortest path is within the reference value range.

The reference value range can be set by users according to the actual requirement or can be set by the mobile robot by default which is not limited in the embodiments of the present application.

Step 3403, during a movement of the mobile robot according to the first detection path, obtaining a second region environment map through the detection sensor detecting the region environment, the second region environment map comprising an outer contour of a region environment detected by the mobile robot during the movement and an outer contour of the first region environment map.

Its specific implementation can refer to the step 2506 of the embodiment in FIG. 25.

Step 3404, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing an operation of determining the region environment map until the mobile robot detects that the entire region environment map is drawn.

As an example, the steps can refer to the step 2507 of the embodiment in FIG. 25.

The mobile robot is configured to move along the outer contour while keeping a certain distance from the outer contour and/or moves along an edge of the outer contour when moving according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as wall and obstacles such as a marble, a glass, and the mobile robot moves according to a certain detection path, it may first move along the outer contour while keeping the certain distance from the outer contour, and then moves along the edge of the outer contour.

Embodiment 15

Please refer to FIG. 35, FIG. 35 is a detection method according to the Exemplary embodiment. The detection method can be applied to the above mobile robot, the method includes:

Step 3501, obtaining a first region environment map through the detection sensor detecting the region environment, the first region environment map comprising an outer contour of the region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment.

Its specific implementation can refer to the step S1 of the embodiment in FIG. 6.

Step 3502, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor.

Due to a detection range of the mobile robot detecting a region environment for one time is limited, thus the region environment map drawn is only a part of the region environment. Therefore, the mobile robot needs to move in the region environment to expand the detection range, thereby collecting more detection data to draw an entire region environment map. For this reason, the mobile robot needs to generate a detection path to guide the mobile robot to move to expand the detection range of the mobile robot.

In some embodiment, the first region environment map is a grid map. The first region environment map includes the detected region and the undetected region. The detected region is a region that has been detected by the detection sensor. The undetected region is a region that has not been detected by the detection sensor. The detected region includes a passable region, which represents a region where the mobile robot can pass.

As an example, the detected region in the first region environment map is specifically a region detected by a mobile robot through the laser radar and/or the non-laser radar detection sensor. The detected region includes the outer contour of the first region environment and the passable region. Further, the detected region may also include mobile robots, base stations, and middle obstacles, that is, in drawing the first region environment map, the mobile robot can identify a position of the base station. As abovementioned, before executing a detection, the robot is parked in the base station, thus the position of the base station can be determined according to a distance and angle that the mobile robot has moved, thereby marking the position of the base station on the first region environment map. In addition, the undetected region is the region that has been not detected by the mobile robot. The mobile robot cannot determine whether the undetected region is the passable region or a region locating a obstacle. Due to a detection range of the laser signal of the laser radar is limited, the laser radar cannot detect the region environment outside the detection range, and when the laser signal of the laser radar is blocked by the obstacle, the laser radar cannot detect a region behind the obstacle. These regions which the laser radar cannot detect are the undetected regions.

As an example, the warning region where the target grid is located can be set in the first region environment map. The warning region is used to indicate the region where the mobile robot needn't to repeatedly detect. As an example, the warning region can include the following two aspects. In one aspect, as an example, when a distance between the free obstacle and an obstacle at the outer contour of the region environment is less than a distance threshold, a region between the two obstacles is set as the warning region. The outer contour of the region environment also includes the warning region. In other aspect, the traversal trajectory information of a trajectory of traversing target grids is obtained when the outer contour of the first region environment is detected. The grids where the traversal trajectory indicated by the traversal trajectory information is located is determined as the warning region.

For the first aspect, the warning region refers to a region that needn't to be detected. When the distance between the free obstacle and an obstacle at the outer contour of the region environment is less than the distance threshold, the mobile robot cannot work in the region, thus the region can be set as the warning region. The warning region together with the free obstacle and an obstacle at the outer contour of the region environment are used as the outer contour of the region environment.

The distance threshold can be set by users according to the actual requirement, or be set by the mobile robot by default, which is not limited in the embodiment of the present application. For example, the distance threshold can be set as 1.5 times width of the mobile robot.

For the second aspect, due to the limitation of the detection conditions of the mobile robot itself, the detection results of the mobile robot at two times before and after can be different for the same position. For example, when drawing a region environment map for the ith time on a certain grid, the mobile robot marks it as a detected region. However, when drawing a region environment map for the (i+1)th time, the mobile robot marks it as an undetected region. In this way, in order to be able to detect the certain grid again, when the mobile robot updates the region environment map at the (i+1)th time according to the new detection data, it may be possible to adjust a part of the position of the obstacle region of the original detected region to the undetected region. However, due to this undetected region generated after the adjustment of the region environment map is located in the region that the mobile robot has previously detected, the mobile robot needn't to detect it again. However, the trajectory of traversing the target grid when the outer contour of the first region environment is detected can represent the outer contour of the detected region environment. Therefore, in order to avoid this situation, when detecting the outer contour of the first region environment, the mobile robot obtains the traversal trajectory information of the trajectory of traversing the target grid and determines the grids where the traversal trajectory indicated by the traversal trajectory information is located as the warning region, as shown in FIG. 26. In this way, the undetected regions generated after the adjustment of the region environment map can be shielded by the traversal trajectory, thereby preventing the mobile robot from moving back to repeatedly detect the detected region, thereby reducing the time-consuming for mapping.

After that, in the first region environment map provided with the warning region, the mobile robot traverses the target grids according to the reference hour-hand direction from the detection start point. Please refer to FIG. 31, the target grid can represent the grid where the outer contour of the region environment is located and is represented by the outer contour of the region environment. The detection start point can be the grid point that takes the base station as the start point and has a reference distance to the base station. The reference distance can be preset according to the actual requirement. For example, the reference point can be a first grid point found on the outer contour of the region environment along the reference hour-hand direction starting from the base station. In addition, the reference hour-hand direction can be clockwise direction or counterclockwise direction, which is not limited in the embodiments of the present application. That is to say, the mobile robot traverses the target grids representing obstacles at the edge along a certain fixed hour-hand direction from the detection start point based on the first region environment map to determine the detection target point. The obstacles at the edge can refer to the wall, obstacles placed close to the wall, etc.

As an example, the mobile robot takes the detection target point as a center to determine the end point of the first detection path within the detection range of the detection sensor, that is, it should ensure that the distance between the end point of the first detection path and the detection target point does not exceed the detection range of the detection sensor.

As an example, the current position of the mobile robot when detecting the first region environment map is mapped to the region environment map, the mapped point is determined as the start point of the first detection path, after that a path between the start point of the first detection path and the end point of the first detection path is generated. The first detection path of this time is obtained. As an example, the shortest path between the start point of the first detection path and the end point of the first detection path can be generated, and the shortest path is determined as the first detection path.

Step 3503, during a movement of the mobile robot according to the first detection path, obtaining a second region environment map through the detection sensor detecting the region environment, the second region environment map comprising an outer contour of a region environment detected by the mobile robot during the movement and an outer contour of the first region environment map.

Its specific implementation can refer to the step 2506 of the embodiment in FIG. 25.

Step 3504, in response to detecting that path detection executed by the mobile robot is over, taking the end point of the first detection path as a start point of a second detection path and generating the second detection path based on the second region environment map, determining a third region environment map according to the second detection path, the third region environment map including an outer contour of the region environment detected by the mobile robot during a movement according to the second detection path and an outer contour of the second region environment map, loop executing an operation of determining the region environment map until the mobile robot detects that the entire region environment map is drawn.

As an example, its specific implementation can refer to the step 2507 of the embodiment in FIG. 25.

The mobile robot is configured to move along the outer contour while keeping a certain distance from the outer contour and/or moves along an edge of the outer contour according to the detection path, the detection path refers to a detection path generated based on any one of region environment maps.

That is to say, when detecting along any one of the detection paths, the mobile robot is configured to move along the outer contour while keeping a certain distance from the outer contour, or for some special obstacles such as a marble, a glass, the mobile robot moves along an edge of the outer contour. In some cases, when the outer contour of the region environment includes both obstacles such as wall and obstacles such as a marble, a glass, and the mobile robot moves according to a certain detection path, it may first move along the outer contour while keeping the certain distance from the outer contour, and then moves along the edge of the outer contour.

In some embodiment, the base station may also be parked in the middle of the room, and there exists a large obstacle similar to the wall of the room close to the base station, as shown in FIG. 29. In this case, After the mobile robot detects around obstacle for One week according to the above implementation, the closed loop is formed, as shown in FIG. 29. The mobile robot judges whether itself is in the closed loop. If itself is not in the closed loop, it means that what to be detected is not the outer contour of the region environment. In this case, the mobile robot takes the base station as an origin and takes a certain threshold as a radius to redetermine a detection start point at the vicinity of the obstacles at the edge of the room, and redetects the region environment from the detection start point. The threshold can be set according to actual requirement.

FIG. 36 is a structure schematic diagram of a detection device according to an exemplary embodiment. The detection device is configured in a mobile robot and configured to detect a region environment for drawing a region environment map. The mobile robot is provided with a detection sensor, the region environment map is gradually expanded by a combination of a detection of the detection sensor with a behavior path plan of the mobile robot until an entire region environment map is finally generated, wherein a region which has been detected by the detection sensor is a detected region, a region which has not been detected by the detection sensor is an undetected region, the device includes:

an obtaining module 3510 configured for obtaining a first region environment map through the detection sensor detecting a region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment;

a determination module 3520 configured for determining a detection target point based on the first region environment map, the detection target point being a position needed to be detected by the mobile robot, and generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor;

a detection module 3530 configured for during a movement of the mobile robot according to the first detection path, obtaining a second region environment map through the detection sensor detecting the region environment, the second region environment map comprising an outer contour of a region environment detected by the mobile robot during the movement and an outer contour of the first region environment map; and a cycle module 3540 configured for in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing an operation of determining a region environment map until the mobile robot detects that the entire region environment map is completely drawn.

In a possible implementation of the present application, the obtaining module 3510 is configured for setting a region between a free obstacle and an obstacle at the outer contour of the region environment as a warning region when a distance between the two obstacles is less than a distance threshold. The outer contour also includes the warning region.

In a possible implementation of the present application, the determination module 3520 is configured for extracting the outer contour of the region environment and the undetected region from the first region environment map to form a detection map, and determining a detection start point in the detection map; starting from the detection start point, and traversing the outer contour of the region environment in the detection map along a clockwise or counterclockwise direction to query a first point located at a junction of the detected region and the undetected region as the detection target point.

In a possible implementation of the present application, the determination module 3520 is configured for taking the detection target point as a center to determine the end point of the first detection path within the detection range of the mobile robot, a distance between the detection target point and the end point of the first detection path not exceeding the detection range of the sensor of the mobile robot to enable the mobile robot to detect the detection target point at the end point of the first detection path; and generating the first detection path by taking the start point of the first detection path as a start point and taking the end point of the first detection path as an end point.

In a possible implementation of the present application, the determination module 3520 is configured for determining a fixed position in the outer contour of the region environment in the detection map as the detection start point.

In a possible implementation of the present application, the determination module 3520 is configured for starting from a position of the base station and searching along a clockwise or counterclockwise direction, and taking a first point detected on the outer contour of the region environment as the detection start point.

In a possible implementation of the present application, the determination module 3520 is configured for determining the detection target point as the end point of the detection path.

In a possible implementation of the present application, the end point of the first detection path is before the detection target point in the preset clockwise or counterclockwise direction.

In a possible implementation of the present application, the determination module 3520 is configured for setting the start point of the first detection path and the end point of the first detection path on the detection map, a length of the first detection path being a length of a shortest path between a current position of the mobile robot and the end point of the first detection path.

In a possible implementation of the present application, the determination module 3520 is configured for setting the start point of the first detection path and the end point of the first detection path on the detection map, a difference value between a length of the first detection path and a length of a shortest path between the start point of the first detection path and the end point of the first detection path being within a distance threshold.

In a possible implementation of the present application, the determination module 3540 is configured for determining that the path detection is over when the mobile robot moves to the end point of the first detection path.

In a possible implementation of the present application, the determination module 3540 is configured for determining that the path detection is over when a surrounding of the detection target point in the detected region environment map becomes the detected region.

In a possible implementation of the present application, the determination module 3540 is configured for determining that the path detection is over when the mobile robot detects that there exists an obstacle in the first detection path.

In a possible implementation of the present application, the determination module 3540 is configured for determining that the entire region environment is drawn when detecting that the outer contour of the region environment is an enclosed obstacle region.

In a possible implementation of the present application, the determination module 3540 is configured for determining that the entire region environment is drawn when no detection point is found by the mobile robot.

In a possible implementation of the present application, the detection sensor is a laser radar, and the mobile robot further includes a non-laser radar detection sensor; and detection data include data detected by the laser radar and data detected by the non-laser radar detection sensor.

In the embodiments of the present application, the mobile robot determines a first region environment map with the detection sensor detecting the region environment, the first region environment map includes an outer contour of a detected region and an undetected region. The detection target point corresponding to a position needed to be detected is determined according to the first region environment map. An end point of the first detection path of the first detection path is determined based on the detection target point. In such way, the first detection path is generated based on a current position of the mobile robot when detecting the first region environment map and the end point of the first detection path. The mobile robot moves along the first detection path and obtains the detection data detected by the detection sensor during a movement. When it is detected that the path detection is over, a next detection path is determined based on the obtained detection data, that is, a second detection path is determined, and a second region environment map is obtained by executing a detection operation based on the second detection path. In such way, an operation of determining the detection path to generate the region environment map is executed cyclically to gradually expand the region environment map until the mobile robot detects that the entire region environment map is drawn. The mobile robot detects the region environment based on the generated detection path every time, thereby avoiding a problem of repeating detection of the detected region when the mobile robot goes back and forth to the base station, and improving work efficiency. In addition, the mobile robot does not need to traverse all passable regions, thereby reducing the time-consuming for mapping of the mobile robot.

It should be noted that when the detection device provided in the above-mentioned embodiment implements the detection method, the division of the above-mentioned function modules is used only as an example for illustration. In actual applications, the above-mentioned functions can be completed by different function modules as needed, that is, the internal structure of the device is divided into different function modules to complete all or part of the functions described above. In addition, the detection device provided by the above-mentioned embodiments and the embodiments of the detection method belong to the same concept, and the specific implementation process is detailed in the method embodiments, and will not be repeated here.

Those of ordinary skill in the art can understand that all or part of the steps in the above-mentioned embodiments can be implemented by hardware, or by a program instructing related hardware. The program can be stored in a computer-readable storage medium. The above-mentioned storage medium can be a read-only memory, a magnetic disk or an optical disk, etc.

The above descriptions are only optional embodiments of the present application and are not intended to limit the present application. Any modification, equivalent replacement, improvement, etc. made within the spirit and principle of the present application shall be included in the protection scope of the present application.

What is claimed is:

1. A detection method, applied to a mobile robot to detect a region environment for drawing a region environment map, wherein the mobile robot is provided with a detection sensor, the region environment map is gradually expanded by a combination of detection of the detection sensor and a behavior path of the mobile robot until an entire region environment map is finally generated, wherein a region detected by the detection sensor is a detected region, a region not detected by the detection sensor is an undetected region; the method comprises:

step S1, obtaining a first region environment map through the detection sensor detecting the region environment, the first region environment map comprising an outer contour of a region environment currently detectable by the mobile robot and the undetected region, the outer contour comprising obstacles around the region environment, the obstacles representing a wall around the region environment, an obstacle placed against the wall and a free obstacle, the free obstacle being an obstacle that is less than or equal to a body width of the mobile robot from any other obstacle on the outer contour of the region environment;

step S2, determining a detection target point based on the first region environment map, the detection target point being a position needed to be detected by the mobile robot, generating a first detection path based on the detection target point, the first detection path being configured for guiding the mobile robot to move, the first detection path comprising a start point of the first detection path and an end point of the first detection path, the start point of the first detection path being a current position of the mobile robot when detecting the first region environment map, a distance between the end point of the first detection path and the detection target point not exceeding a detection range of the detection sensor;

step S3, during a movement of the mobile robot according to the first detection path, obtaining a second region environment map through the detection sensor detecting the region environment, the second region environment map comprising an outer contour of a region environment detected by the mobile robot during the movement and the outer contour of the first region environment map; and step S4, in response to detecting that path detection executed by the mobile robot is over, taking the end point of the first detection path as a start point of a second detection path and generating the second detection path based on the second region environment map, determining a third region environment map according to the second detection path, the third region environment map comprising an outer contour of a region environment detected by the mobile robot during a movement according to the second detection path and an outer contour of the second region environment map, loop executing an operation of determining a region environment map until the mobile robot detects that the entire region environment map is drawn; wherein the mobile robot is configured to move along the outer contour while keeping a certain distance from the outer contour and/or move along an edge of the outer contour when moving according to the detection path generated based on any one of region environment maps;

wherein the step S2, determining a detection target point based on the first region environment map comprises:

step S201, extracting the outer contour of the region environment and the undetected region from the first region environment map to form a detection map, and determining a detection start point in the detection map; and step S202, starting from the detection start point, traversing the outer contour of the region environment in the detection map along a clockwise or counterclockwise direction to query a first point located at a junction of the detected region and the undetected region as the detection target point; and the step S2, generating a first detection path based on the detection target point comprises:

step S203, determining the end point of the first detection path within a detection range of the mobile robot by taking the detection target point as a center, the distance between the detection target point and the end point of the first detection path not exceeding the detection range of the detection sensor of the mobile robot, such that the mobile robot is capable of detecting the detection target point at the end point of the first detection path; and step S204, generating the first detection path by taking the start point of the first detection path as a start point and taking the end point of the first detection path as an end point.

2. The detection method according to claim 1, wherein the step S1, obtaining a first region environment map through the detection sensor detecting the region environment, the first region environment map comprising an outer contour of the region environment currently detectable by the mobile robot and the undetected region comprises:

setting a region between the free obstacle and the other obstacle on the outer contour of the region environment as a warning region when a distance therebetween is less than a distance threshold, the outer contour further comprising the warning region.

3. The detection method according to claim 1, wherein the step S201, extracting the outer contour of the region environment and the undetected region from the first region environment map to form a detection map, and determining a detection start point in the detection map comprises:

determining a fixed position on the outer contour of the region environment in the detection map as the detection start point.

4. The detection method according to claim 3, wherein the determining a fixed position on the outer contour of the region environment in the detection map as the detection start point comprises:

starting from a position of the base station and searching along the clockwise or counterclockwise direction, and taking a first point detected on the outer contour of the region environment as the detection start point.

5. The detection method according to claim 1, wherein the step S203, determining the end point of the first detection path within the detection range of the mobile robot by taking the detection target point as a center comprises:

determining the detection target point as the end point of the first detection path.

6. The detection method according to claim 5, wherein the step S204, generating the first detection path by taking the start point of the first detection path as a start point and taking the end point of the first detection path as an end point comprises:

setting the start point of the first detection path and the end point of the first detection path on the detection map, a length of the first detection path being a length of a shortest path between a current position of the mobile robot and the end point of the first detection path.

7. The detection method according to claim 5, wherein the step S204, generating the first detection path by taking the start point of the first detection path as a start point and taking the end point of the first detection path as an end point comprises:

setting the start point of the first detection path and the end point of the first detection path on the detection map, a difference value between a length of the first detection path and a length of a shortest path being within a distance threshold, the shortest path refers to a shortest path between the start point of the first detection path and the end point of the first detection path.

8. The detection method according to claim 1, wherein the step S203, determining the end point of the first detection path within the detection range of the mobile robot by taking the detection target point as a center comprises:

the end point of the first detection path being located before the detection target point in a preset clockwise or counterclockwise direction.

9. The detection method according to claim 1, wherein the step S4, detecting by the mobile robot that the path detection executed thereby is over comprises:

determining that the path detection is over when the mobile robot moves to the end point of the first detection path.

10. The detection method according to claim 1, wherein the step S4, detecting by the mobile robot that the path detection executed thereby is over comprises:

determining that the path detection is over when a surrounding of the detection target point in the detected region environment map becomes the detected region.

11. The detection method according to claim 1, wherein the step S4, detecting by the mobile robot that the path detection executed thereby is over comprises:

determining that the path detection is over when the mobile robot detects that there is an obstacle in the first detection path.

12. The detection method according to claim 1, wherein the step S4, the mobile robot detects that the entire region environment map is drawn comprises:

determining that the entire region environment map is drawn when detecting that the outer contour of the region environment is an enclosed obstacle region.

13. The detection method according to claim 1, wherein the step S4, the mobile robot detects that the entire region environment map is drawn comprises:

determining that the entire region environment map is drawn when no detection point is found by the mobile robot.

14. The detection method according to claim 1, wherein the detection sensor is a laser radar, and the mobile robot further comprises a non-laser radar detection sensor; and detection data comprises data detected by the laser radar and data detected by the non-laser radar detection sensor.

15. A mobile robot, wherein the mobile robot is provided with a detection sensor, and the mobile robot comprises:
a processor; and
a memory configured for storing executable instructions of the processor;
wherein the processor is configured for implementing steps of the method as recited in claim 1.

16. A non-transitory computer readable storage medium, wherein instructions are stored on the non-transitory computer readable storage medium, when the instructions are executed by a processor, steps of the method as recited in claim 1 are implemented.

* * * * *